US010445293B2

United States Patent
Attarde et al.

(10) Patent No.: US 10,445,293 B2
(45) Date of Patent: *Oct. 15, 2019

(54) MANAGING DELETIONS FROM A DEDUPLICATION DATABASE

(71) Applicant: Commvault Systems, Inc., Tinton Falls, NJ (US)

(72) Inventors: Deepak Raghunath Attarde, Marlboro, NJ (US); Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,900

(22) Filed: Jun. 27, 2018

(65) Prior Publication Data

US 2019/0012328 A1 Jan. 10, 2019

Related U.S. Application Data

(63) Continuation of application No. 14/216,689, filed on Mar. 17, 2014, now Pat. No. 10,380,072.

(51) Int. Cl.
*G06F 17/30* (2006.01)
*G06F 16/174* (2019.01)
(Continued)

(52) U.S. Cl.
CPC ........ *G06F 16/1748* (2019.01); *G06F 3/0641* (2013.01); *G06F 11/1453* (2013.01)

(58) Field of Classification Search
None
See application file for complete search history.

(56) References Cited

U.S. PATENT DOCUMENTS 4,084,231 A    4/1978   Capozzi et al.
4,267,568 A    5/1981   Dechant et al.
(Continued)

FOREIGN PATENT DOCUMENTS

EP    0259912    3/1988
EP    0405926    1/1991
(Continued)

OTHER PUBLICATIONS

Ngo, et al., U.S. Appl. No. 12/499,717 now U.S. Pat. No. 8,930,306, filed Jul. 8, 2009, Synchronized Data Duplication.
(Continued)

*Primary Examiner* — Tyler J Torgrimson
(74) *Attorney, Agent, or Firm* — Knobbe Martens Olson & Bear LLP

(57) ABSTRACT

An information management system can manage the removal of data block entries in a deduplicated data store using working copies of the data block entries residing in a local data store of a secondary storage computing device. The system can use the working copies to identify data blocks for removal. Once the deduplication database is updated with the changes to the working copies (e.g., using a transaction based update scheme), the system can query the deduplication database for the database entries identified for removal. Once identified, the system can remove the database entries identified for pruning and/or the corresponding deduplication data blocks from secondary storage.

20 Claims, 15 Drawing Sheets

(51) Int. Cl.
*G06F 3/06* (2006.01)
*G06F 11/14* (2006.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescenti et al. |
| 7,065,619 B1 | 6/2006 | Zhu et al. |
| 7,082,441 B1 | 7/2006 | Zahavi |
| 7,085,904 B2 | 8/2006 | Mizuno et al. |
| 7,100,089 B1 | 8/2006 | Phelps |
| 7,103,617 B2 | 9/2006 | Phatak |
| 7,107,298 B2 | 9/2006 | Prahlad et al. |
| 7,107,395 B1 | 9/2006 | Ofek |
| 7,117,246 B2 | 10/2006 | Christenson et al. |
| 7,130,860 B2 | 10/2006 | Pachet |
| 7,130,970 B2 | 10/2006 | Devassy et al. |
| 7,143,091 B2 | 11/2006 | Charnock |

(56) References Cited

U.S. PATENT DOCUMENTS

| | | |
|---|---|---|
| 7,155,465 B2 | 12/2006 | Lee |
| 7,155,633 B2 | 12/2006 | Tuma |
| 7,162,496 B2 | 1/2007 | Amarendran et al. |
| 7,174,433 B2 | 2/2007 | Kottomtharayil et al. |
| 7,194,454 B2 | 3/2007 | Hansen |
| 7,197,665 B2 | 3/2007 | Goldstein |
| 7,225,210 B2 | 5/2007 | Guthrie, II |
| 7,243,163 B1 | 7/2007 | Friend et al. |
| 7,246,207 B2 | 7/2007 | Kottomtharayil et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,315,923 B2 | 1/2008 | Retnamma et al. |
| 7,343,356 B2 | 3/2008 | Prahlad |
| 7,343,453 B2 | 3/2008 | Prahlad et al. |
| 7,343,459 B2 | 3/2008 | Prahlad |
| 7,346,751 B2 | 3/2008 | Prahlad |
| 7,383,462 B2 | 6/2008 | Osaki et al. |
| 7,389,311 B1 | 6/2008 | Crescenti et al. |
| 7,395,282 B1 | 7/2008 | Crescenti et al. |
| 7,412,583 B2 | 8/2008 | Burton |
| 7,437,388 B1 | 10/2008 | DeVos |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,500,053 B1 | 3/2009 | Kavuri et al. |
| 7,516,186 B1 | 4/2009 | Borghetti et al. |
| 7,519,726 B1 | 4/2009 | Palliyll et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,568,080 B2 | 7/2009 | Prahlad et al. |
| 7,574,692 B2 | 8/2009 | Herscu |
| 7,577,806 B2 | 8/2009 | Rowan |
| 7,581,077 B2 | 8/2009 | Ignatius et al. |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,664,771 B2 | 2/2010 | Kusters |
| 7,685,126 B2 | 3/2010 | Patel et al. |
| 7,702,782 B1 | 4/2010 | Pai |
| 7,720,841 B2 | 5/2010 | Gu et al. |
| 7,730,113 B1 | 6/2010 | Payette et al. |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,743,051 B1 | 6/2010 | Kashyap et al. |
| 7,747,577 B2 | 6/2010 | Cannon et al. |
| 7,747,579 B2 | 6/2010 | Prahlad et al. |
| 7,761,425 B1 | 7/2010 | Erickson et al. |
| 7,797,279 B1 | 9/2010 | Starling et al. |
| 7,801,864 B2 | 9/2010 | Prahlad et al. |
| 7,809,914 B2 | 10/2010 | Kottomtharayil et al. |
| 7,814,074 B2 | 10/2010 | Anglin et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 7,840,533 B2 | 11/2010 | Prahlad et al. |
| 7,899,871 B1 | 3/2011 | Kumar et al. |
| 7,962,452 B2 | 6/2011 | Anglin et al. |
| 8,074,043 B1 | 12/2011 | Zeis |
| 8,095,756 B1 | 1/2012 | Somavarapu |
| 8,108,446 B1 | 1/2012 | Christiaens |
| 8,108,638 B2 | 1/2012 | Kishi |
| 8,131,669 B2 | 3/2012 | Cannon et al. |
| 8,145,614 B1 | 3/2012 | Zimran et al. |
| 8,156,086 B2 | 4/2012 | Lu et al. |
| 8,170,995 B2 | 5/2012 | Prahlad et al. |
| 8,199,911 B1 | 6/2012 | Tsaur et al. |
| 8,200,638 B1 | 6/2012 | Zheng et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,224,875 B1 | 7/2012 | Christiaens et al. |
| 8,229,954 B2 | 7/2012 | Kottomtharayil et al. |
| 8,230,195 B2 | 7/2012 | Amarendran et al. |
| 8,261,240 B2 | 9/2012 | Hoban |
| 8,280,854 B1 | 10/2012 | Emmert |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan et al. |
| 8,370,315 B1 | 2/2013 | Efstathopoulos et al. |
| 8,370,542 B2 | 2/2013 | Lu et al. |
| 8,375,008 B1 | 2/2013 | Gomes |
| 8,375,181 B1 | 2/2013 | Kekre et al. |
| 8,407,190 B2 | 3/2013 | Prahlad et al. |
| 8,468,320 B1 | 6/2013 | Stringham |
| 8,484,162 B2 | 7/2013 | Prahlad et al. |
| 8,510,573 B2 | 8/2013 | Muller et al. |
| 8,527,469 B2 | 9/2013 | Hwang et al. |
| 8,549,350 B1 | 10/2013 | Dutch et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,849,762 B2 | 9/2014 | Kumarasamy et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan et al. |
| 9,020,900 B2 | 4/2015 | Vijayan et al. |
| 9,092,441 B1 | 7/2015 | Patiejunas et al. |
| 9,098,495 B2 | 8/2015 | Gokhale |
| 9,104,623 B2 | 8/2015 | Vijayan et al. |
| 9,110,602 B2 | 8/2015 | Vijayan et al. |
| 9,116,850 B2 | 8/2015 | Vijayan et al. |
| 9,128,901 B1 | 9/2015 | Nickurak |
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan et al. |
| 9,251,186 B2 | 2/2016 | Muller et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan et al. |
| 9,665,591 B2 | 5/2017 | Vijayan et al. |

(56) References Cited

U.S. PATENT DOCUMENTS

| | | |
|---|---|---|
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0105716 A1 | 6/2003 | Lorin, Jr. et al. |
| 2003/0115346 A1 | 6/2003 | McHenry et al. |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0182789 A1 | 7/2009 | Sandorfi et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1* | 12/2009 | Jaquette ............ G06F 3/0608 711/160 |
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1 | 6/2010 | Lin et al. |
| 2010/0169287 A1 | 7/2010 | Klose |
| 2010/0180075 A1 | 7/2010 | McCloskey et al. |

(56) References Cited

U.S. PATENT DOCUMENTS

| | | |
|---|---|---|
| 2010/0198864 A1 | 8/2010 | Ravid et al. |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306283 A1 | 12/2010 | Johnson et al. |
| 2010/0312752 A1 | 12/2010 | Zeis et al. |
| 2010/0318759 A1 | 12/2010 | Hamilton et al. |
| 2010/0332454 A1 | 12/2010 | Prahlad et al. |
| 2011/0010498 A1 | 1/2011 | Lay et al. |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan Retnamma et al. |
| 2012/0166403 A1 | 6/2012 | Kim et al. |
| 2012/0185437 A1 | 7/2012 | Pavlov et al. |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0115287 A1 | 4/2014 | Schnapp et al. |
| 2014/0181028 A1 | 6/2014 | Prahlad et al. |
| 2014/0195749 A1 | 7/2014 | Colgrove et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |
| 2014/0281758 A1 | 9/2014 | Klein et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0154220 A1 | 6/2015 | Ngo et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0261776 A1 | 9/2015 | Attarde et al. |
| 2015/0269032 A1 | 9/2015 | Muthyala et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan et al. |
| 2016/0266980 A1 | 9/2016 | Muller et al. |
| 2016/0299818 A1 | 10/2016 | Vijayan et al. |
| 2016/0306707 A1 | 10/2016 | Vijayan et al. |
| 2016/0306708 A1 | 10/2016 | Prahlad et al. |
| 2016/0306818 A1 | 10/2016 | Vijayan et al. |
| 2016/0350391 A1 | 12/2016 | Vijayan et al. |
| 2017/0031768 A1 | 2/2017 | Sarab |
| 2017/0083558 A1 | 3/2017 | Vijayan et al. |
| 2017/0083563 A1 | 3/2017 | Vijayan et al. |
| 2017/0090773 A1 | 3/2017 | Vijayan et al. |
| 2017/0090786 A1 | 3/2017 | Parab et al. |
| 2017/0168903 A1 | 5/2017 | Dornemann et al. |
| 2017/0185488 A1 | 6/2017 | Kumarasamy et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |
| 2017/0192868 A1 | 7/2017 | Vijayan et al. |
| 2017/0193003 A1 | 7/2017 | Vijayan et al. |
| 2017/0199699 A1 | 7/2017 | Vijayan et al. |
| 2017/0206219 A1 | 7/2017 | Vijayan et al. |
| 2017/0235647 A1 | 8/2017 | Kilaru et al. |
| 2017/0242871 A1 | 8/2017 | Kilaru et al. |
| 2017/0315876 A1 | 11/2017 | Domquast et al. |
| 2018/0075055 A1 | 3/2018 | Ngo et al. |
| 2018/0189314 A1 | 7/2018 | Mitkar et al. |
| 2018/0196720 A1 | 7/2018 | Muller et al. |
| 2019/0012237 A1 | 1/2019 | Prahlad et al. |
| 2019/0026305 A1 | 1/2019 | Vijayan et al. |
| 2019/0205290 A1 | 7/2019 | Vijayan et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |

OTHER PUBLICATIONS

Prahlad, et al., U.S. Appl. No. 12/724,292 now U.S. Pat. No. 8,484,162, filed Mar. 15, 2010, De-Duplication Systems and Methods for Application-Specific Data.

Vijayan, et al., U.S. Appl. No. 12/982,071 now U.S. Pat. No. 8,364,652, filed Dec. 30, 2010, Content Aligned Block-Based Deduplication.

Vijayan, et al., U.S. Appl. No. 12/982,086 now U.S. Pat. No. 8,577,851, filed Dec. 30, 2010, Content Aligned Block-Based Deduplication.

Vijayan, et al., U.S. Appl. No. 12/982,087 now U.S. Pat. No. 8,572,340, filed Dec. 30, 2010, Systems and Methods for Retaining and Using Data Block Signatures in Data Protection Operations.

Vijayan, et al., U.S. Appl. No. 12/982,100 now U.S. Pat. No. 8,578,109, filed Dec. 30, 2010, Systems and Methods for Retaining and Using Data Block Signatures in Data Protection Operations.

(56) References Cited

OTHER PUBLICATIONS

Vijayan, et al., U.S. Appl. No. 13/324,613 now U.S. Pat. No. 9,020,900, filed Dec. 13, 2011, Distributed Deduplicated Storage System.
Retnamma, et al., U.S. Appl. No. 13/324,792 now U.S. Pat. No. 9,116,850, filed Dec. 13, 2011, Client-Side Repository in a Networked Deduplicated Storage System.
Retnamma, et al., U.S. Appl. No. 13/324,817 now U.S. Pat. No. 8,954,446, filed Dec. 13, 2011, Client-Side Repository in a Networked Deduplicated Storage System.
Vijayan, et al., U.S. Appl. No. 13/324,848 now U.S. Pat. No. 9,104,623, filed Dec. 13, 2011, Client-Side Repository in a Networked Deduplicated Storage System.
Retnamma, et al., U.S. Appl. No. 13/324,884 Abandoned, filed Dec. 13, 2011, Client-Side Repository in a Networked Deduplicated Storage System.
Vijayan, et al., U.S. Appl. No. 13/750,105 now U.S. Pat. No. 9,110,602, filed Jan. 25, 2013, Content Aligned Block-Based Deduplication.
Muller, et al., U.S. Appl. No. 13/916,385 Published as 2013/0339298 Abandoned, filed Jun. 12, 2013, Collaborative Backup in a Networked Storage System.
Muller, et al., U.S. Appl. No. 13/916,409 now U.S. Pat. No. 9,218,374, filed Jun. 12, 2013, Collaborative Restore in a Networked Storage System.
Muller, et al., U.S. Appl. No. 13/916,429 Published as 2013/0339310 Abandoned, filed Jun. 12, 2013, Restore Using a Client Side Signature Repository in a Networked Storage System.
Muller, et al., U.S. Appl. No. 13/916,434 now U.S. Pat. No. 9,251,186, filed Jun. 12, 2013, Backup Using a Client-Side Signature Repository in a Networked Storage System.
Muller, et al., U.S. Appl. No. 13/916,458 now U.S. Pat. No. 9,218,375, filed Jun. 12, 2013, Dedicated Client-Side Signature Generator in a Networked Storage System.
Muller, et al., U.S. Appl. No. 13/916,467 now U.S. Pat. No. 9,218,376, filed Jun. 12, 2013, Intelligent Data Sourcing in a Networked Storage System.
Prahlad, et al., U.S. Appl. No. 13/931,654 now U.S. Pat. No. 9,405,763, filed Jun. 28, 2013, De-Duplication Systems and Methods for Application-Specific Data.
Vijayan, et al., U.S. Appl. No. 14/040,247 now U.S. Pat. No. 9,239,687, filed Sep. 27, 2013, Systems and Methods for Retaining and Using Data Block Signatures in Data Protection Operations.
Vijayan, et al., U.S. Appl. No. 14/152,509 now U.S. Pat. No. 9,633,033, filed Jan. 10, 2014, High Availability Distributed Deduplicated Storage System.
Vijayan, et al., U.S. Appl. No. 14/152,549 now U.S. Pat. No. 9,665,591, filed Jan. 10, 2014, High Availability Distributed Deduplicated Storage System.
Attarde, et al., U.S. Appl. No. 14/216,689 Published as 2015/0261776, filed Mar. 17, 2014, Managing Deletions From a Deduplication Database.
Attarde, et al., U.S. Appl. No. 14/216,703 now U.S. Pat. No. 9,633,056, filed Mar. 17, 2014, Maintaining a Deduplication Database.
Mitkar, et al., U.S. Appl. No. 14/527,678 now U.S. Pat. No. 9,575,673, filed Oct. 29, 2014, Accessing a File System Using Tiered Deduplication.
Ngo, et al., U.S. Appl. No. 14/555,322 Published as 2015/0154220 Abandoned, filed Nov. 26, 2014, Synchronized Data Duplication.
Vijayan, et al., U.S. Appl. No. 14/673,021 Published as 2015/0205681, filed Mar. 30, 2015, Client-Side Repository in a Networked Deduplicated Storage System.
Vijayan, et al., U.S. Appl. No. 14/673,586 now U.S. Pat. No. 9,898,478, filed Mar. 30, 2015, Distributed Deduplicated System.
Vijayan, et al., U.S. Appl. No. 14/682,988 Published as 2016/0299818, filed Apr. 9, 2015, Highly Reusable Deduplication Database After Disaster Recovery.
Vijayan, et al., U.S. Appl. No. 14/721,971 Published as 2016/0350391, filed May 26, 2015, Replication Using Deduplicated Secondary Copy Data.
Vijayan, et al., U.S. Appl. No. 14/821,418 now U.S. Pat. No. 9,619,480, filed Aug. 7, 2015, Content Aligned Block-Based Deduplication.
Muller, et al., U.S. Appl. No. 14/956,185 Abandoned, filed Dec. 1, 2015, Collaborative Restore in a Networked Storage System.
Muller, et al., U.S. Appl. No. 14/956,213 Published as 2016/0188416 Abandoned, filed Dec. 1, 2015, Dedicated Client-Side Signature Generator in a Networked Storage System.
Vijayan, et al., U.S. Appl. No. 14/967,097 Published as 2016/0196070 Abandoned, filed Dec. 11, 2015, Systems and Methods for Retaining and Using Data Block Signatures in Data Protection Operations.
Muller, et al., U.S. Appl. No. 15/067,714 now U.S. Pat. No. 9/858,156, filed Mar. 11, 2016, Dedicated Client-Side Signature Generator in a Networked Storage System.
Muller, et al., U.S. Appl. No. 15/067,766 Published as 2016/0266980, filed Mar. 11, 2016, Collaborative Restore in a Networked Storage System.
Vijayan, et al., U.S. Appl. No. 15/074,109 now U.S. Pat. No. 9,639,289, filed Mar. 18, 2016, Systems and Methods for Retaining and Using Data Block Signatures in Data Protection Operations.
Vijayan, et al., U.S. Appl. No. 15/197,434 Published as 2016/0306707, filed Jun. 29, 2016, Highly Reusable Deduplication Database After Disaster Recovery.
Vijayan, et al., U.S. Appl. No. 15/197,435 Published as 2016/0306818, filed Jun. 29, 2016, Highly Reusable Deduplication Database After Disaster Recovery.
Prahlad, et al., U.S. Appl. No. 15/198,269 Published as 2016/0306708, filed Jun. 30, 2016, De-Duplication Systems and Methods for Application-Specific Data.
Vijayan, et al., U.S. Appl. No. 15/282,445 Published as 2017/0083563, filed Sep. 30, 2016, Replication Using Deduplicated Secondary Copy Data.
Vijayan, et al., U.S. Appl. No. 15/282,553 Publihsed as 2017/0083558, filed Sep. 30, 2016, Replication Using Deduplicated Secondary Copy Data.
Vijayan, et al., U.S. Appl. No. 15/282,668 Published as 2017/0090773, filed Sep. 30, 2016, Replication Using Deduplicated Secondary Copy Data.
Vijayan, et al., U.S. Appl. No. 15/299,254 Published as 2017/0192866, filed Oct. 20, 2016, System for Redirecting Requests After a Secondary Storage Computing Device Failure.
Vijayan, et al., U.S. Appl. No. 15/299,280 Publihsed as 2017/0192867, filed Oct. 20, 2016, Rebuilding Deduplication Data in a Distributed Deduplication Data Storage System.
Vijayan, et al., U.S. Appl. No. 15/299,281 Published as 2017/0192868, filed Oct. 20, 2016, User Interface for Identifying a Location of a Failed Secondary Storage Device.
Vijayan, et al., U.S. Appl. No. 15/299,290 Published as 2017/0192860, filed Oct. 20, 2016, Deduplication Replication in a Distributed Deduplication Data Storage System.
Vijayan, et al., U.S. Appl. No. 15/299,298 Publihsed as 2017/0192861, filed Oct. 20, 2016, Distributed File System in a Distributed Deduplication Data Storage System.
Vijayan, et al., U.S. Appl. No. 15/299,299 Published as 2017/0193003, filed Oct. 20, 2016, Redundant and Robust Distributed Deduplication Data Storage System.
Mitkar, et al., U.S. Appl. No. 15/399,597 now U.S. Pat. No. 9,934,238, filed Jan. 5, 2017, Accessing a File System Using Tiered Deduplication.
Vijayan, et al., U.S. Appl. No. 15/449,246 now U.S. Pat. No. 9,898,225, filed Mar. 3, 2017, Content Aligned Block-Based Deduplication.
Vijayan, et al., U.S. Appl. No. 15/472,737 Published as 2017/0199699, filed Mar. 29, 2017, Systems and Methods for Retaining and Using Data Block Signatures in Data Protection Operations.
Vijayan, et al., U.S. Appl. No. 15/474,730 Published as 2017/0206219, filed Mar. 30, 2017, High Availability Distributed Deduplicated Storage System.

(56) References Cited

OTHER PUBLICATIONS

Ngo, et al., U.S. Appl. No. 15/684,812 Published as 2018/0075055, filed Aug. 23, 2017, Synchronized Data Duplication.
Muller, et al., U.S. Appl. No. 15/820,152 Published as 2018/0196720, filed Nov. 21, 2017, Dedicated Client-Side Signature Generator in a Networked Storage System.
Vijayan, et al., U.S. Appl. No. 15/875,896, filed Jan. 19, 2018, Distributed Deduplicated Storage System.
Mitikar, et al., U.S. Appl. No. 15/899,699 Published as 2018/0189314, filed Feb. 20, 2018, Accessing a File System Using Tiered Deduplication.
Prahlad, et al., U.S. Appl. No. 15/991,849, filed May 29, 2018, De-Duplication Systems and Methods for Application-Specific Data.
Armstead et al., "Implementation of a Campus-Wide Distributed Mass Storage Service: The Dream vs. Reality," IEEE, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Bhagwat, Extreme Binning: Scalable, Parallel Deduplication for Chunk-based File Backup. IEEE 2009, 9 pages.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Cohen, Edith, et al.,. "The Age Penalty and Its Effect on Cache Performance." In USITS, pp. 73-84. 2001.
Cohen, Edith, et al.,."Aging through cascaded caches: Performance issues in the distribution of web content." In ACM Sigcomm Computer Communication Review, vol. 31, No. 4, pp. 41-53. ACM, 2001.
Cohen, Edith, et al.,. "Refreshment policies for web content caches." Computer Networks 38.6 (2002): 795-808.
CommVault Systems, Inc. "Continuous Data Replicator 7.0," Product Data Sheet, 2007.
CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.
Diligent Technologies "HyperFactor," http://www.dilligent.com/products:protecTIER-1:HyperFactor-1, Internet accessed on Dec. 5, 2008, 2 pages.
Dubnicki, et al. "HYDRAstor: A Scalable Secondary Storage." FAST. vol. 9.2009, 74 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray (#2 of 2, pp. 604-609), Jim; Reuter Andreas, Transaction Processing Concepts and Techniques, Morgan Kaufmann Publisher, USA 1994, pp. 604-609.
Guo et al., Building a High-performance Deduplication System, Jun. 15, 2011, retrieved from the Internet at <URL: http://dl.acm.org/citation.cfm?id=2002206>, pp. 1-14.
Huff, KL "Data Set Usage Sequence Number," IBM Technical Disclosure Bulletin, vol. 24, No. 5, Oct. 1981 New York, US, pp. 2404-2406.
Dander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.
Final Office Action for Japanese Application No. 2003531581, dated Mar. 24, 2009, 6 pages.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No. PCT/US2013/045443 dated Nov. 14, 2013, 16 pages.
International Preliminary Report on Patentability, International Application No. PCT/US2013/045443 dated Dec. 16, 2014 11 pages.

\* cited by examiner

MANAGING DELETIONS FROM A DEDUPLICATION DATABASE

CROSS-REFERENCE TO RELATED APPLICATIONS

The present application is a Continuation of U.S. patent application Ser. No. 14/216,689 filed on Mar. 17, 2014, which was filed concurrently with U.S. application Ser. No. 14/216,703 now U.S. Pat. No. 9,633,056, and which are incorporated herein by reference in their entireties.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or sub-file data blocks). The sizes of the data blocks can be of fixed or variable length. As new data enters the system, the data units can be checked to see if they already exist in the storage system. If the data unit already exists, instead of storing and/or communicating a duplicate copy, the storage system stores and/or communicates a reference to the existing data unit. Thus, deduplication can improve storage utilization, system traffic (e.g., over a networked storage system), or both.

Even in those systems employing deduplication, data management operations, including backup and restore operations, can place heavy demands on available network bandwidth and available system resources. Such operations can also introduce significant delay, e.g., due to communication latency between secondary storage (e.g., non-production, backup storage) and primary storage (e.g., production storage). In addition, if a device or script involved in the deduplication process fails or becomes unavailable, recovering from such failures to restore the deduplication to the pre-failure state can be quite time consuming.

SUMMARY

For example, in some cases, deduplication database pruning operations (e.g., data block deletion operations) are performed at infrequent intervals, and a lengthy log of pending pruning operations is compiled over time. At the next pruning interval, the system "plays back" the log to actually implement the pruning operations in the deduplication database. In such cases, playing back the full pruning history in the event of a system crash can take a long time.

In accordance with certain aspects of the disclosure, solutions described herein address these and other challenges. Some of these solutions incorporate the use of a locally maintained data structure residing on a secondary storage computing device or other storage controller computer, such as in a main memory of the secondary storage computing device. This local data structure can be referred to as an in-memory database (IMDB), for example. The local database can retain working copies of deduplication database entries, where a full version of the deduplication database exists external to the secondary storage computing device. For instance, the complete version of the deduplication database may be contained in one or more secondary storage devices, and can also be referred to as an on-disk database (ODDB). The deduplication database entries can include certain information related to deduplication data blocks stored in the secondary storage devices. For instance, for any given data block, the database entries can include a signature corresponding to the data block, a pointer to a copy of the data block stored in the secondary storage devices, a count value corresponding to a number of references to the data block in a set of deduplicated files maintained in the secondary storage, and the like. The working copies in the local database can include some or all of the information included the corresponding database entries.

As storage operations occur in secondary storage, the system can modify the working copy of the database entries in the local database (e.g., residing in main memory), without initially modifying corresponding database entries stored in the full version of the database. The working copies in the local database can be flushed from the local database secondary storage computing device and/or merged with the full version of the database. For instance, the working copies may be flushed and/or merged with the full version of the deduplication database according to a transaction-based scheme, when the local database reaches a threshold size or upon expiration of a threshold period of time since the last time the local database was flushed. The working copies can be set to read-only or otherwise set to prevent write access during the transaction to preserve the integrity of the transaction. The threshold size or time period can be selected such that transactions (e.g., additions and modifications to entries) are flushed from the local database to the deduplication database with sufficient regularity to keep the deduplication database relatively current (e.g., at no more than 1, 2, or 5 minute intervals). This can reduce the time required for rebuilding and bringing the deduplication database back online in the event of certain failures, such as hardware or software crashes associated with the secondary storage computing device.

According to additional aspects, the local database can be used in conjunction with pruning certain deduplication information from the information management system in a manner that improves crash recovery. For instance, the system can query the merged database entries to identify any entries indicating that a pruning event (e.g., a deletion of a data block and/or corresponding deduplication signature, etc.) should occur, such as where an entry for a particular data block indicates that there are no longer any deduplicated files that reference an instance of that data block. If the local database is flushed and merged with the full deduplication database at a sufficient frequency, pruning operations will be written out to and reflected in the deduplication database relatively promptly, e.g., without the need to build and play back a lengthy pruning log in the event of a crash. In some embodiments, some scheduled pruning events may be missed in the event of a crash, such as if the local database is lost prior to a merge with the complete deduplication database. However, because of the transaction-based scheme the database is updated relatively frequently, only a relatively small number of pruning events will be lost for any given crash. In such cases, this small number of pruning events can be re-issued by the system.

DETAILED DESCRIPTION

Systems and methods are described herein for implementing a transaction-based deduplication database management scheme incorporating the use of deduplication information local to a secondary storage computing device. Some such systems and methods involve the use of working copies of deduplication database entries or other appropriate deduplication information maintained in main memory of the secondary storage computing device. The working copies can be merged with a deduplication database residing in one or more secondary storage devices on a relatively frequent basis, such as upon satisfaction of a size threshold of a data structure containing the working copies, or upon expiration of a threshold period of time following the last merge operation. Such techniques can reduce the time required for rebuilding and bringing a deduplication data store back online in the event of certain failures, such as hardware or software crashes associated with the secondary storage computing device. Examples of such systems and methods are discussed in further detail herein, e.g., in reference to FIGS. 2-9. Moreover, it will be appreciated that such components and functionality may be configured for use with and/or incorporated into information management systems such as those that will now be described with respect to FIGS. 1A-1H.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
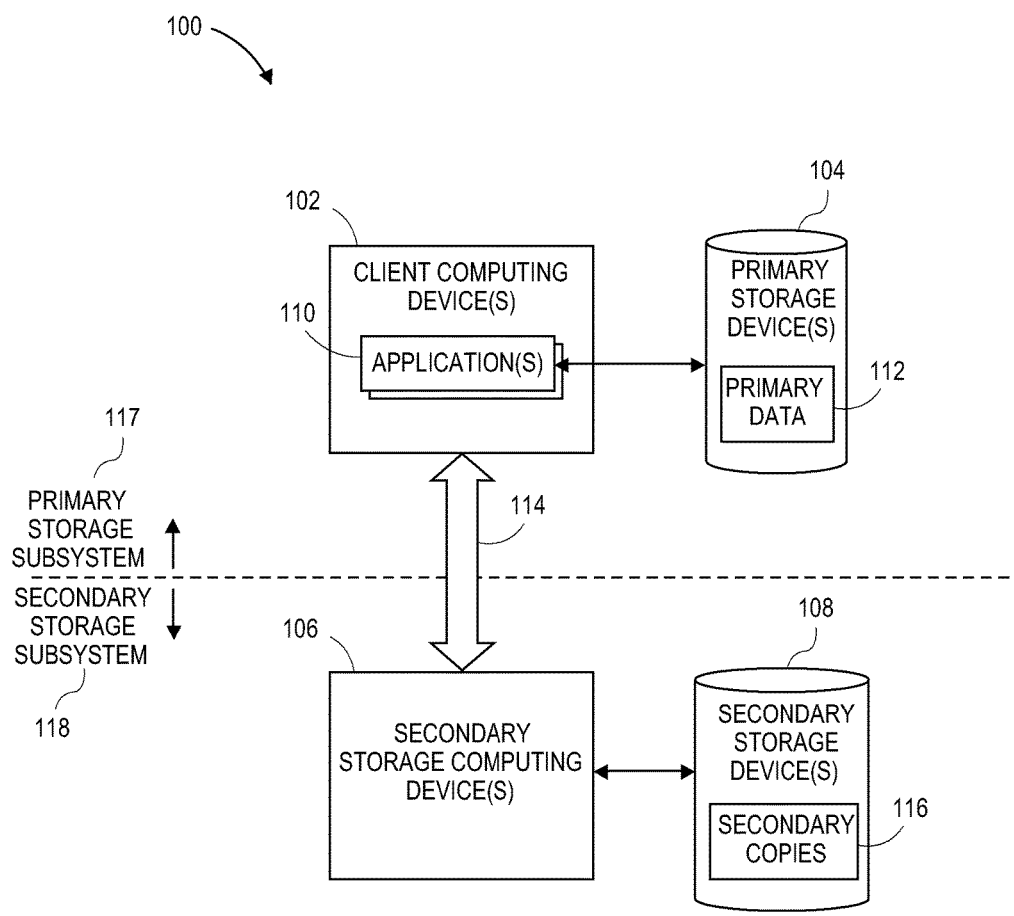
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";
- U.S. Pat. Pub. No. 2012/0150818, entitled "Client-Side Repository in a Networked Deduplicated Storage System";
- U.S. Pat. No. 8,170,995, entitled "Method and System for Offline Indexing of Content and Classifying Stored Data";
- U.S. Pat. No. 7,107,298, entitled "System And Method For Archiving Objects In An Information Store";
- U.S. Pat. No. 8,230,195, entitled "System And Method For Performing Auxiliary Storage Operations";
- U.S. Pat. No. 8,229,954, entitled "Managing Copies Of Data"; and
- U.S. Pat. No. 8,156,086, entitled "Systems And Methods For Stored Data Verification".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
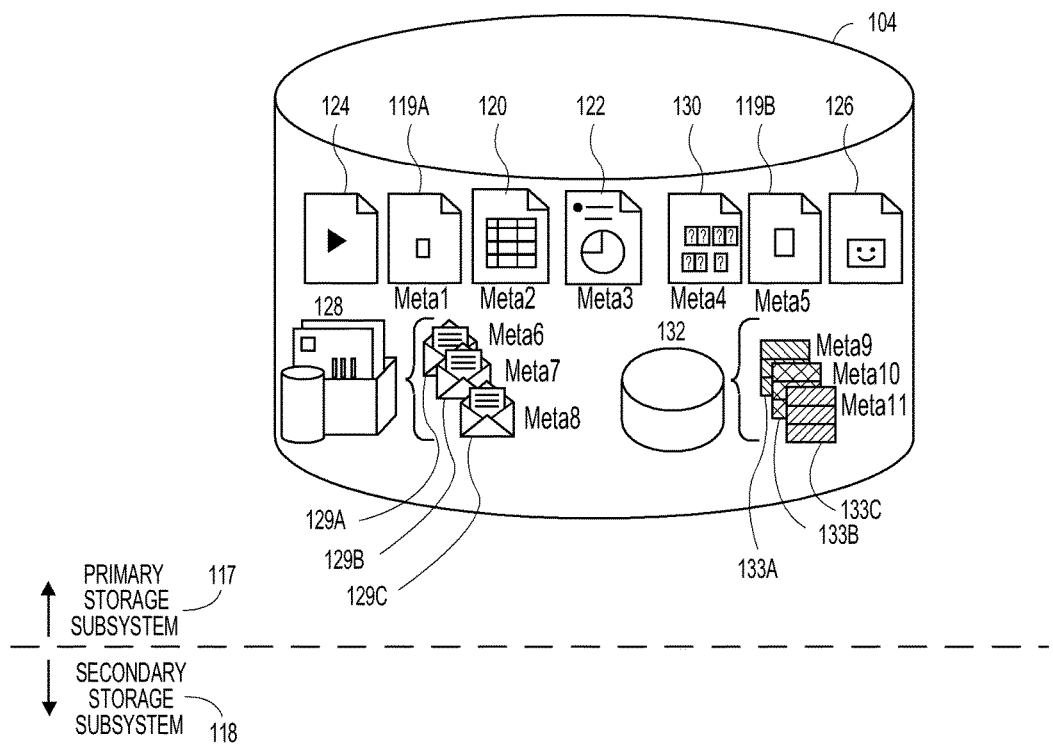
FIG. 1B is a detailed view of a primary storage device, a secondary storage device, and some examples of primary data and secondary copy data.
Figure 1B:
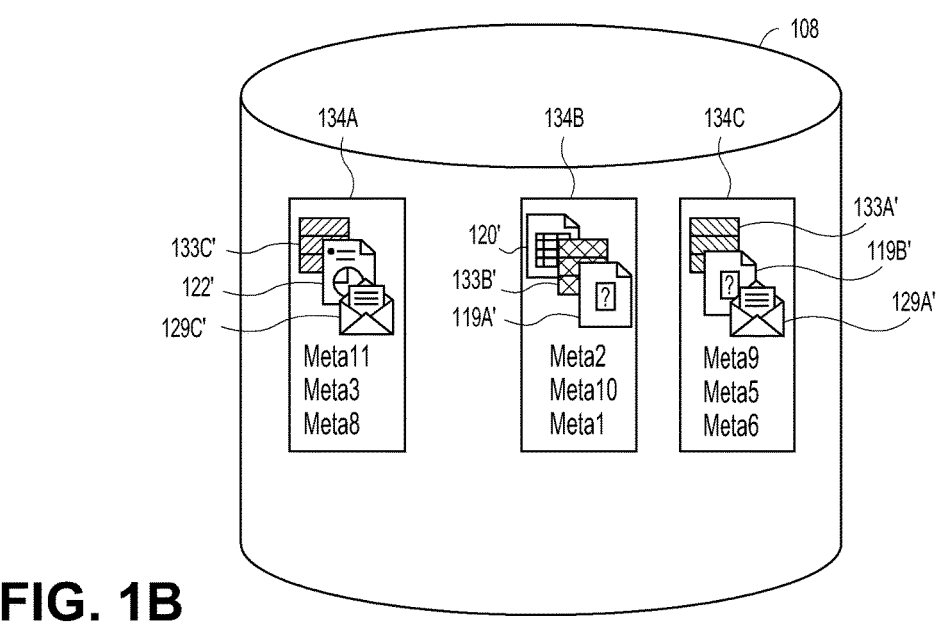

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
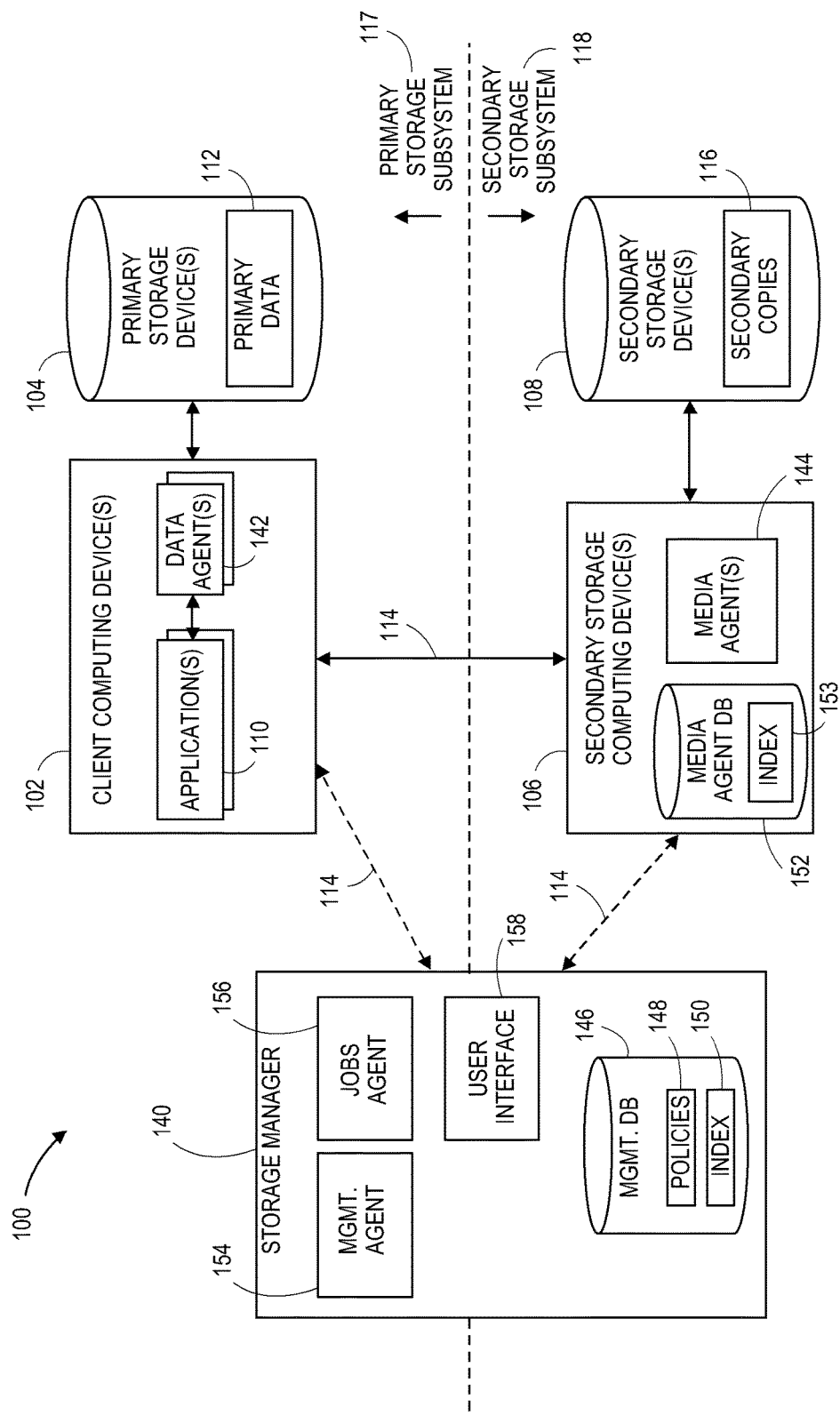
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to backup the Exchange mailboxes, a Microsoft Exchange Database data agent 142 to backup the Exchange databases, a Microsoft Exchange Public Folder data agent 142 to backup the Exchange Public Folders, and a Microsoft Windows File System data agent 142 to backup the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
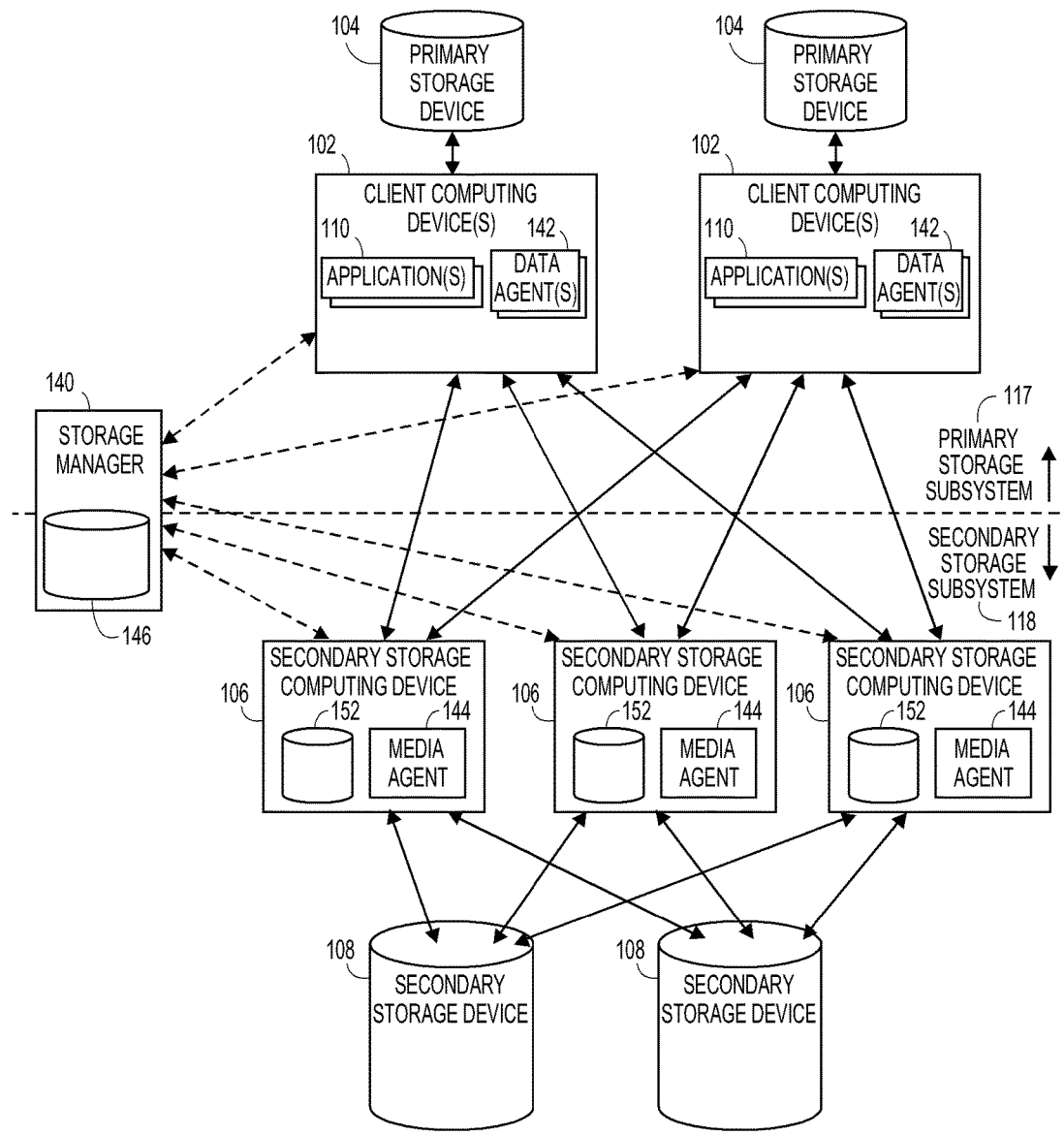
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
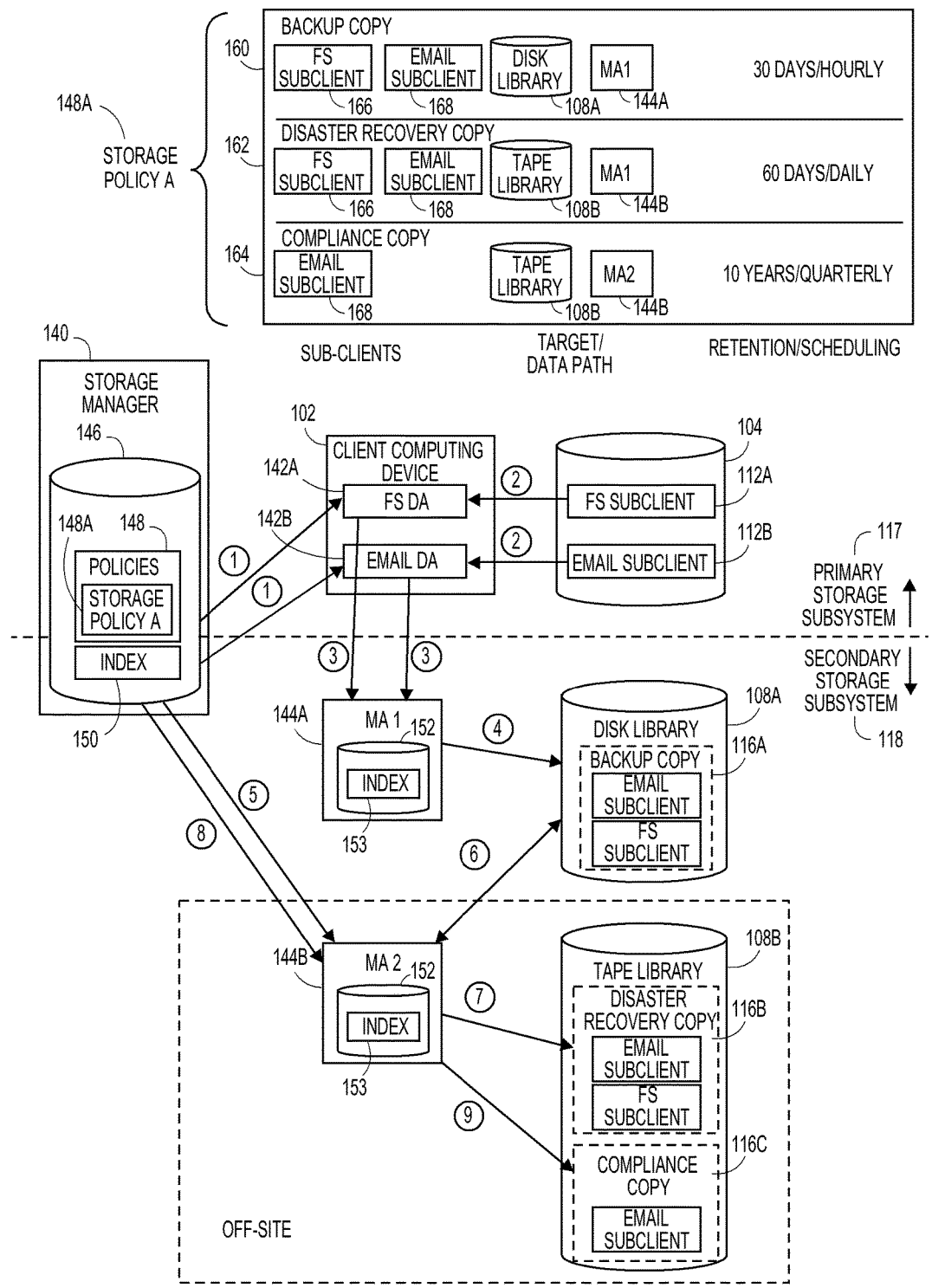
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
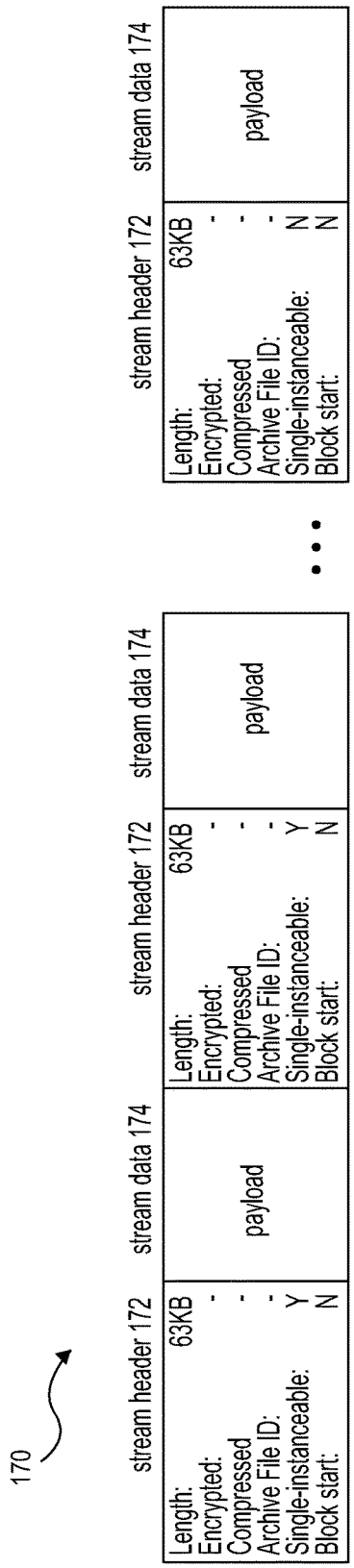
FIGS. 1F-1H are block diagrams illustrating suitable data structures that may be employed by the information management system.
Figure 1G:
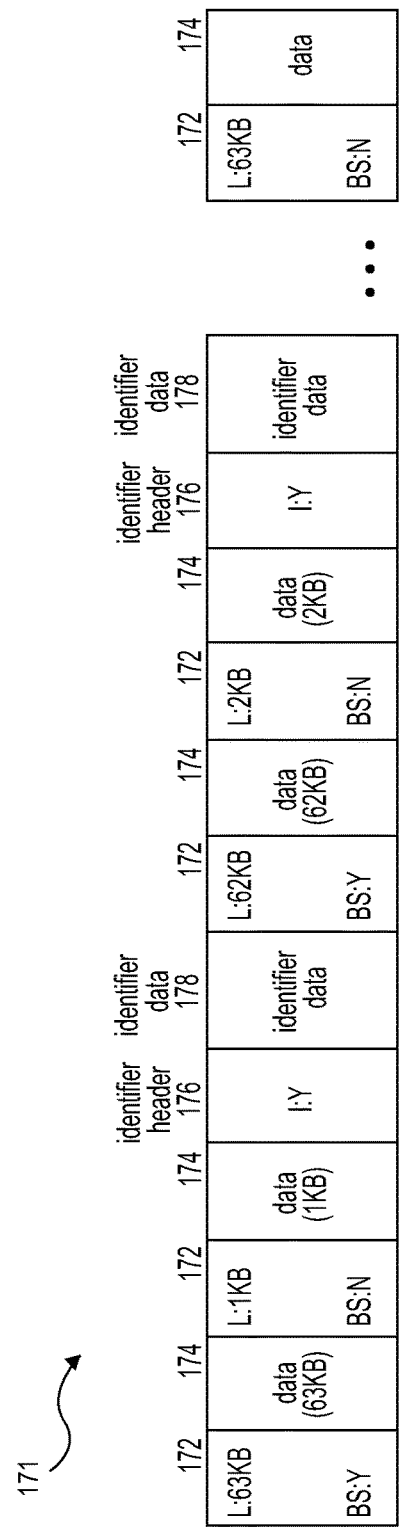

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
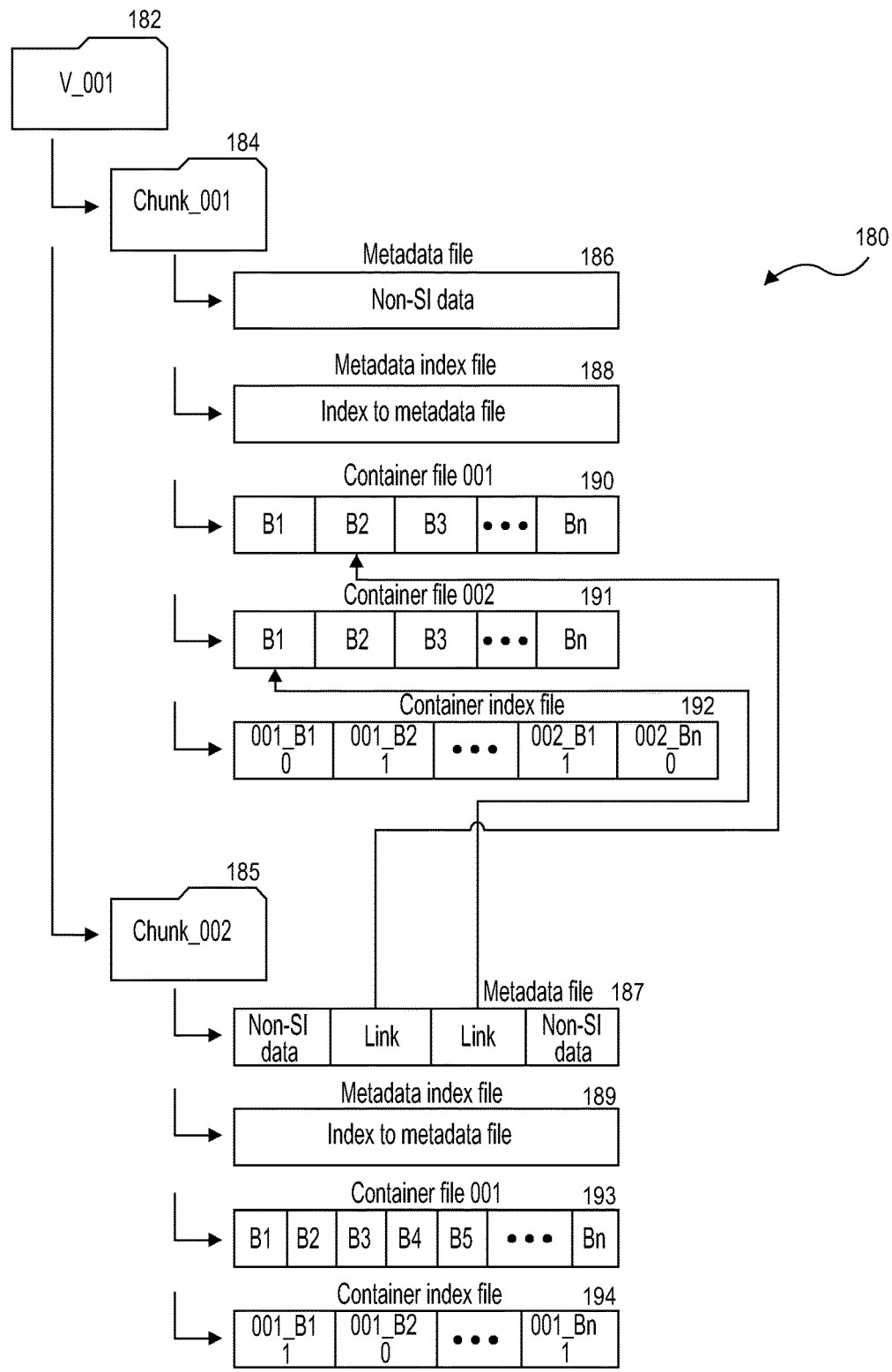

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Example Information Management Systems Including Local Deduplication Database(s)

Examples of systems and methods will now be described for using information local to a secondary storage computing device 106 to improve information management operations, particularly with respect to management of a stored set of deduplicated data. For example, deduplication data block information can be updated on a generally continuous or otherwise frequent basis in memory that is local to one or more secondary storage computing devices 106. These local updates can be forwarded for persistent storage in one or more secondary storage device(s) 108 according to a transaction-based scheme, thereby providing a relatively robust and efficient mechanism for maintaining deduplication information in the secondary storage subsystem 118.

While described in some cases with respect to certain types of operations (e.g., backup and pruning operations), the techniques described herein may be equally compatible with other types of storage operations including archive, snapshot, and replication operations, to name a few. Descriptions of embodiments of these and other types storage operations compatible with embodiments described are provided above. Moreover, certain aspects of such techniques may be employed for use in conjunction with stored data sets that are not deduplicated.

Figure 2:
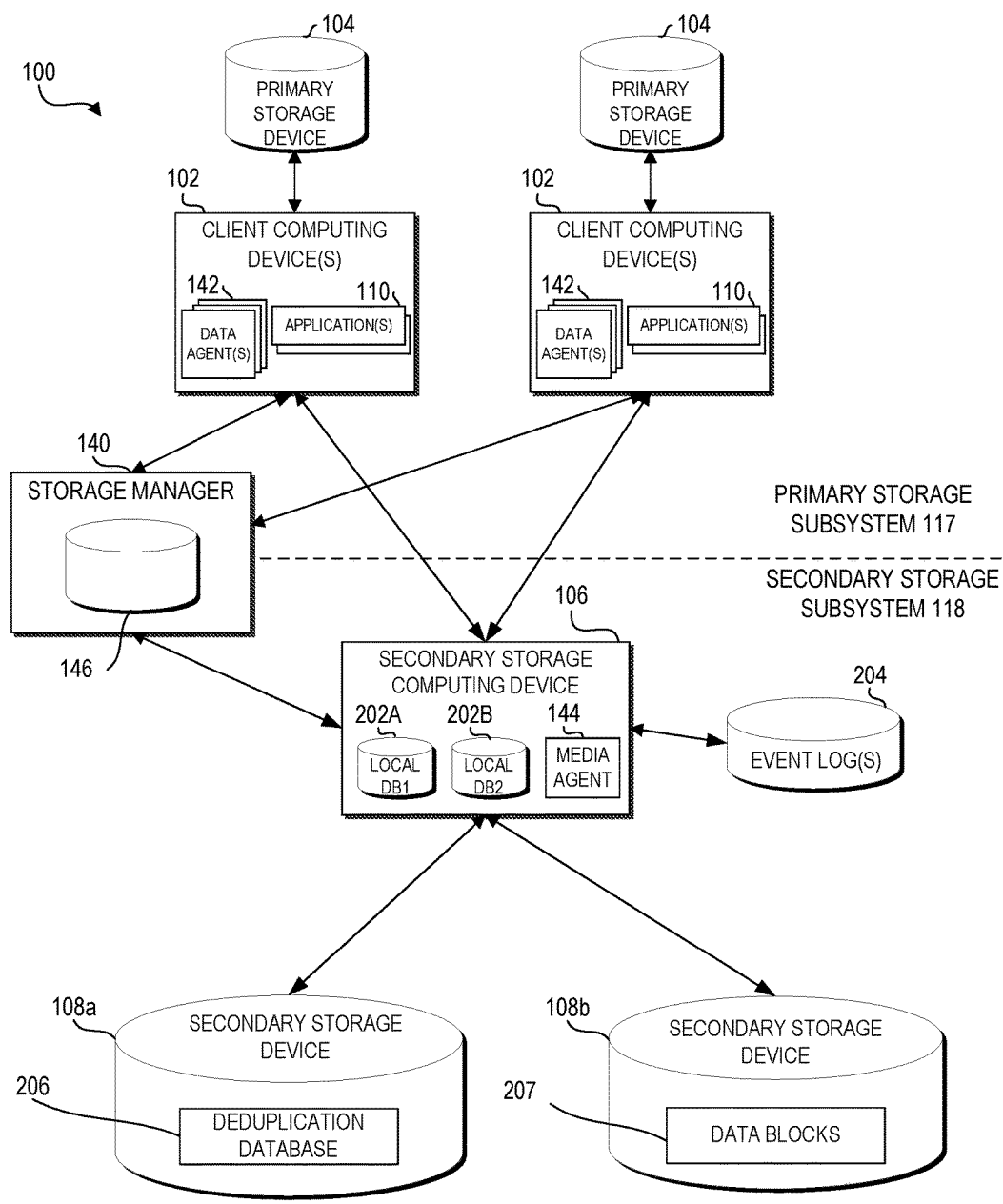
FIG. 2 is a block diagram illustrative of some portions of an information management system configured to implement information management techniques incorporating a transaction-based deduplication database management scheme, according to an illustrative embodiment.

FIG. 2 shows a block diagram illustrative of an embodiment of an information management system 100. In the illustrated embodiment of FIG. 2, the information management system 100 further includes one or more local databases 202A, 202B (referred to together as local database(s) 202), an event log 204, one or more secondary storage devices 108a containing a deduplication database 206 that includes a set of entries associated with a set of data blocks 207, and one or more storage devices 108b containing the set of data blocks 207 themselves. The deduplication database 206 and the set of data blocks 207 can together form a deduplicated data store, where the set of data blocks 207 form constituent parts of a set of files represented by the deduplicated data store. For instance, the data blocks in the set of data blocks 207 are deduplicated according to a deduplication scheme and each entry in the deduplication database 206 can include a signature of the respective data block (e.g., a hash of the data block) and a reference count corresponding to a number of instances of the respective data block that exist in the set of files represented by the deduplicated data store.

For purposes of the example, the illustrated embodiment has been simplified to include two client computing devices 102, a single storage manager 140, a single secondary storage computing device 106 and corresponding media agent 144, and two secondary storage device 108a, 108b. In other embodiments, different numbers of components are possible. For instance, any desired number of client computing devices 102, secondary storage computing devices 106, media agents 144, and secondary storage devices 108 may be employed, depending on the embodiment.

The deduplication database 206 in the illustrated embodiment is implemented in one or more storage devices 108a that are separate and distinct from the secondary storage computing devices 106. For instance, the deduplication database 206 can communicate with the other components of the information management system 100 via a network such as a SAN, LAN, and/or WAN. In certain other embodiments, the deduplication database 206 can be located at another location. For instance, the deduplication database 206 in one embodiment is contained in one nor more media agent databases 152 associated with the secondary storage computing device(s) 106 (not shown in FIG. 2; see, e.g., FIGS. 1C-1E). In such embodiments, the deduplication database 206 can communicate with the secondary storage computing device 106 via a communication bus, such as via SCSI connection.

In some embodiments, the system 100 can include multiple deduplication databases 206, such as one for each secondary storage computing device 106, and/or can include only one deduplication database 206 that is shared amongst multiple secondary storage computing devices 106 and corresponding media agents 144. When multiple deduplication databases 206 are used, a storage policy can determine the allocation of the deduplication information amongst the multiple deduplication databases, e.g., based on a scheme using data block signatures, as described in greater detail in U.S. Pat. Pub. No. 2012/0150826, previously incorporated herein by reference. In some embodiments, the deduplication database 206 resides on a slower storage medium than the local database 202. For example, if the local database 202 is implemented in the main memory of the secondary storage computing device 106, the deduplication database 206 can be implemented as an on-disk database, such as on a hard drive, disk drive, solid-state drive or other storage medium. For instance, the deduplication database 206 according to some embodiments is implemented in persistent and/or non-volatile memory, where the contents of the deduplication database 206 are persistently stored and remain accessible in the event of a power down of the memory on which the deduplication database 206 resides, or in the event of a crash or other failure associated with the secondary storage computing device 106.

As shown, the deduplication database 206 is stored separately from the corresponding set of data blocks 207. This architecture can provide certain advantages including enhanced scalability, as is described in more detail in U.S. Pat. Pub. No. 2012/0150826. In some embodiments including the illustrated embodiment, the deduplication database 206 stores database entries that correspond to a set of data blocks 207 contained in the one or more secondary storage devices 108b. For example, the database entries in the deduplication database 206 can include or be referred to as signature blocks, where each signature block corresponds to a deduplication data block that is stored in the one or more secondary storage devices 108b. The signature blocks can include a hash or other deduplication signature of the corresponding data block (also referred to as a data block signature), as well as additional information, such as the location (e.g., memory device identifier and/or memory address) of the data block, the number of references to the data block in the deduplicated data store (also referred to as a reference count), the location (e.g., memory device identifier and/or memory address) of references (e.g., pointers) to the data block within the secondary storage device(s) 108b, and/or the age of each reference, etc., as described in greater detail below with reference to FIGS. 3A and 3B and in U.S. Patent App. Pub. No. 2013/0346373, entitled Collaborative Restore in a Networked Storage System, which is hereby incorporated herein by reference in its entirety.

As data blocks are added to and/or removed from the secondary storage device(s) 108b, the signature blocks in the deduplication database 206 can be created, modified, and/or deleted as appropriate, as described in greater detail below. In addition, according to a storage policy, the deduplication database 206 can be backed up to secondary storage in the event of a deduplication database 206 failure, for subsequent restore.

The secondary storage computing device 106 can advantageously locally store and maintain information associated with the deduplication data store. Such information can include information corresponding to entries in the deduplication database 206. For instance, in the illustrated embodiment, the secondary storage computing device 106 maintains local databases 202A, 202B. The local databases 202A, 202B can be organized in a database format or in any other appropriate data structure or format, depending on the embodiment. As is discussed herein, such locally maintained information can be useful in a transaction-based scheme to flush updates to the deduplication database 206.

The local database 202 can store working copies of database entries (e.g., signature blocks) that are, or will be, stored in the deduplication database 206. In some embodiments, the local database 202 stores a subset of the database entries stored in the deduplication database 206. For instance, as will be discussed in further detail, the local database 202 can store working copies corresponding to a subset of the database entries that have been recently modified. In certain other embodiments, local database 202 stores working copies of all of the database entries stored in the deduplication database 206. In some embodiments, the local database 202 can be implemented in main memory of the secondary storage computing device 106. For example, the local database 202 can be implemented in RAM of the secondary storage computing device 106. For instance, the local database 202 can be implemented in relatively faster memory than the memory on which the deduplication database 206 is stored. The local database 202 can be stored in non-persistent and/or volatile memory, e.g., where the contents of the local database 202 may be lost in the event of a power down of the memory on which the local database 202 resides, or in the event of a crash or other failure associated with the secondary storage computing device 106. In certain other embodiments, the local database 202 can be implemented in longer term storage, such as a hard drive, disk drive, solid-state drive, etc.

Each of the working copies of the database entries generally includes information about a corresponding data block in the set of data blocks 207, and can include, for example, information included in the corresponding database entry in the deduplication database 206. For instance, the working copy can include a complete copy of the corresponding signature blocks in the deduplication database 206, or any portion thereof. In certain embodiments, each working copy includes a data block signature and a reference count associated with the corresponding data block. The reference count can indicate the number of references to the data block in the set of files represented by the deduplicated data store. In certain embodiments, each working copy can include other information associated with the corresponding data block, such as the storage location of the data block (e.g., memory device identifier and memory address) and/or other information from the corresponding signature data block stored in the deduplication database 206.

Depending on the situation, the working copies in the local database 202 can be derived from database entries obtained from the deduplication database 206 and/or from deduplication information that does not yet exist in the deduplication database 206 but is instead newly received, e.g., as part of an on-going backup or other information management operation. For example, as will be described in further detail, e.g., with reference to FIG. 4, as part of a backup operation in which data is being backed up from the primary storage devices 104 to the deduplicated data store in secondary storage devices 108a, 108b, it may be appropriate to create and/or modify database entries in the deduplication database 206 that correspond to data blocks that form the files in the backup data set. As the secondary storage computing device 106 processes the backup data set, it can identify the data blocks and can query the local database 202 for working copies of the database entries corresponding to those data blocks. Where working copies exist, the secondary storage computing device 106 can modify the working copy as appropriate. Where working copies do not exist, the secondary storage computing device 106 can request the appropriate database entry from the deduplication database 206, such as where the data block already exists in the deduplicated data store. Or the secondary storage computing device 106 can create a new database entry, such as where a newly added data block is entering the deduplicated data store as part of the backup operation. Once a working copy of a database entry is obtained, the secondary storage computing device 106 updates the working copy as appropriate. For instance, any of the following types of updates are possible, without limitation:

incrementing a reference count of the database entry, such as where one or more new instances of existing data block are added to the deduplicated data store;

decrementing a reference count of the database entry, such as where one or more instances of the existing data block are deleted from the deduplicated data store; and adding an indication to the database entry that the corresponding data block is to be pruned/deleted, such as where there are no remaining instances of the data block referred to in the deduplicated data store, e.g., in the case of a pruning or archive operation.

Thus, the local database can operate similar to a cache where the relevant working copy is already found in the local database 202, and it can be modified as appropriate. On the other hand, if the working copy is not found in the local database 202, it is either generated by the secondary storage computing device 106 or received from the deduplication database 206. For example, the secondary storage computing device 106 can query the deduplication database 206 for the corresponding entry. If the deduplication database 206 has the database entry, it can send the entry or a portion thereof to the secondary storage computing device 106 for storage in the local database 202 as a working copy. If the deduplication database 206 does not have the entry, the local database 202 can generate the entry locally as a working copy. The working copy can include, but is not limited to, the data block signature, information relating to the location of the data block in secondary storage, and a count corresponding to the number of references to the data block that exist in the files maintained in the deduplicated data store.

As indicated, the working copies in the local database 202 can be merged with the deduplication database 206 in order to update the information in the deduplication database 206. For example, the working copies can be merged once a threshold number of working copies reside in the local database 202. In some embodiments, the working copies can be merged once the local database 202 reaches a threshold size (e.g., 10 MB, 100 MB, 1 GB, etc.). In certain embodiments, the working copies can be merged with the deduplication database entries once a threshold time period has been reached, e.g., since the last merge operation. The threshold time can be measured since a previous merge and/or other event, and can be any appropriate value depending on the embodiment, such as least 10 seconds, at least 20 seconds, at least 30 seconds, at least 1 minute, at least 2 minutes, at least 5 minutes, or at least 10 minutes, or more. During or after a merge operation, the local database 202 or a portion thereof can also be flushed to free up space. For example, during a flush, some or all of the working copies can be deleted from one or more of the local databases 202A, 202B.

As illustrated in FIG. 2, the secondary storage computing device 106 can include multiple local databases, such as local databases 202A, 202B. In some other cases, only one local database 202A is used. Although the illustrated embodiment of FIG. 2 only shows two local databases 202A, 202B, it will be understood that the secondary storage computing device 106 can include more than two local databases, as desired. When multiple local databases 202 are used, the local databases 202 can be daisy-chained together, such that if one local database (e.g., 202B) does not have a working copy of a particular database entry, the secondary storage computing device 106 can query one or more other local databases (202A, etc.) for the working copy before requesting the database entry from the deduplication database 206.

For example, in some embodiments, once a first local database (202A) begins to merge with the deduplication database 206, it can be placed in read-only mode (e.g., the information management system 100 can remove write-access) and a second local database (202B) can be identified as the active local database and begin storing and modifying working copies of the database entries. The working copies in the second local database 202B can be obtained or derived from database entries received from the first (or read-only) local database 202A, or other local databases 202 if present, the deduplication database 206.

For example, with reference to FIG. 2, when a working copy of a particular a database entry to be modified does not already reside in the second local database 202B, the secondary storage computing device 106 can query the first local database 202A for a copy. If the first local database 202A has a copy of the database entry in question, the secondary storage computing device 106 can store it in the second local database 202B as a working copy and modify it as appropriate. If the first local database 202A does not have the database entry, the secondary storage computing device 106 can query the deduplication database 206 for the database entry. If the deduplication database 206 has the database entry, it can send it to the secondary storage computing device 106 for storage in the second local database 202B as the working copy, for modification as appropriate. If the deduplication database 206 does not have a database entry corresponding to the data block in question, the data block is new to the deduplicated data store. Thus, the secondary storage device 106 can compile a working copy using the information provided to it as part of the information management operation (e.g., backup) that involves the data block, for storage in the second local database 202B.

The event log 204 can be a data structure used to track storage events associated with the deduplicated data store. The event log 204 can reside on a storage device that is separate and distinct from the secondary storage computing device 106 and/or can reside on memory associated with the secondary storage computing device 106, such as part of the media agent database 152. The secondary storage computing device 106 may create and/or maintain the event log 204, for example. In certain embodiments, each local database 202A, 202B can be associated with a separate event log 204, or a single event log may separately group entries associated with each local database 202A, 202B. In some embodiments, the event log 204 is maintained persistently in non-volatile storage, such that the event log 204 is available for use in recovery operations in the event of a crash of the secondary storage computing device 106 or its corresponding media agent 144, as will be discussed further herein.

Log entries associated with relevant storage events can be added to the event log 204, either as the events occur, or following completion of the events. For example, during an information management operation, such as a backup operation, snapshot operation, etc., each modification to a working copy of the local database 202 can be stored in the event log 204. The event log 204 can include information such as which working copy was modified, how it was modified (e.g., database entry added for new data block, reference count incremented/decremented, etc.), a timestamp, etc. In some cases, the event log 204 does not log or track pruning events, or events that result or are intended to result in the deletion of a data block from the set of data blocks 207 and/or a corresponding database entry from the deduplication database 206. For instance, where an storage event results in the reference count of a working copy in the local database 202 decrementing to zero, indicating a deletion of the corresponding data block and/or data base entry is appropriate, the event log 204 in some cases does not add a corresponding log entry. In contrast, the event log 204 in such cases can be configured to add a log entry for a storage event resulting in the addition of a data block to the set of data blocks 207, or a storage event resulting in the incrementing of the reference count of a working copy in the local database 202.

Additional information related to the information management operation can be included in the event log 204 as appropriate, such as the start/end time of an operation on the primary storage subsystem 117 and/or deduplication database 206, start/end time of a merge operation between the local database 202 and the deduplication database 206, timestamp indicating when a working copy was generated or pruned, etc. In embodiments where each local database 202A, 202B has a corresponding event log 204, the event log 204 for each local database 202A, 202B can store log entries of the storage events that occurred when the corresponding local database 202A, 202B was active.

In some embodiments, the event log 204 can be pruned, flushed or otherwise modified over time. For example, following a merge of the local database 202 with the deduplication database 206, the log entries in the event log 204 that correspond to the working copies that were merged with the deduplication database 206 can be deleted, or the entire event log can be flushed. Similarly, following a backup of the deduplication database 206 to the secondary storage device 108, the log entries that correspond to the database entries in the deduplication database 206 that were backed up to the secondary storage device 106 can be deleted in some cases.

The information stored by the event log 204 can be used by the information management system 100 to restore the local database 202 following the unavailability or failure of the secondary storage computing device 106, as described in greater detail below, e.g., with reference to FIG. 8. For example, following a secondary storage computing device 106 failure, the information management system 100 can use the event log 204 to identify the most recent merge time of the local database 202 with the deduplication database 206. In addition, the information management system 100 can identify the storage events for which entries (e.g., working copies) in the local database 202 were not merged with the corresponding entries in the deduplication database 206 as a result of the secondary storage computing device 106 failure (e.g., the storage events that occurred after the merge time). Once identified, the information management system 100 can replay the storage events that were not merged to recreate, or reconstruct, the entries (e.g., working copies) in the local database 202. Once the entries in the local database 202 are reconstructed, they can be merged with the deduplication database 206. Following the merge, the storage manager 140 can indicate that the deduplication database 206 is up-to-date, or online.

Example Deduplication Database

Figure 3A:
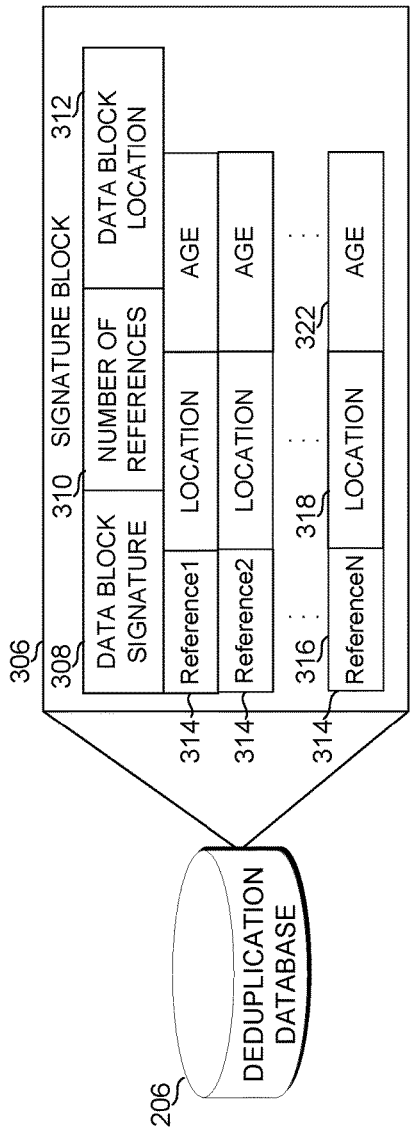
FIG. 3A is a block diagram illustrative of an expanded view of some portions a deduplication database according to an illustrative embodiment.

FIG. 3A is a block diagram illustrative of an expanded view of an embodiment of the deduplication database 206, which can be implemented on one or more storage devices. Although not illustrated in FIGS. 3A and 3B, one or more computing devices and/or software modules (e.g., one or more secondary storage computing devices 106 and/or corresponding media agents 144) can maintain and convey data to and from the deduplication database 206.

While the data block-related information in the deduplication database 206 can be organized in a variety of ways, in certain embodiments, the information is arranged as a plurality of signature blocks 306 as shown in FIG. 3A. Each signature block 306 can correspond to a unique or substantially unique data block signature 308 and corresponding data block in the deduplicated data store.

In some embodiments, each signature block 306 includes information regarding the references stored in the deduplicated data store in the secondary storage subsystem 118 that refer to the corresponding data block (also referred to as data block references). Furthermore, signature blocks 306 stored in the deduplication database 206 can include various other pieces of information, or metadata associated with the corresponding data block. For example, each signature block 306 can include a signature field 308 including the data block signature 308, a number of references (or reference count) field 310 that identifies the number references to the data block that are found in the deduplicated data store in the secondary storage subsystem 118, a data block location field 312 that provides the storage location of the data block in the secondary storage subsystem 118 (e.g., memory device identifier and memory address information). The signature block 306 can also include a set of reference entries 314, each corresponding to a different reference to the data block in the deduplicated data store. As one illustrative example, three files are stored in the deduplicated data store. Two instances of a particular data block form constituent parts of the first file, a single instance of the data block is included in the second file, and the third file does not include any instances of the data block. In this example, there would be three reference entries 314 corresponding to the three instances of that data block. The reference entries 314 can further include a location information field 318 and an age information field 322, described further below.

Each signature block 306 can include additional or less information as desired. Moreover, in some embodiments, the deduplication database 206 can be organized differently. For instance, while the illustrated embodiment generally groups entries for the data block references into a separate signature block 306 for each unique signature; other embodiments may instead organize the entries according to some other scheme. In some embodiments, entries can be grouped based on the time the data block reference was added to the secondary storage subsystem 118, or according to any other appropriate scheme.

Generally speaking, the data block signatures 308 can be used as a reference to determine whether a particular data block is already stored in the secondary storage subsystem 118 and/or in the local database 202 or deduplication database 206. The signature in the signature field 308 can be derived by performing a hash or other function on the corresponding data block. The signature 308 can be generated by a variety of different components, depending on the implementation, such as the client computing device 102, the secondary storage computing device 106, the storage manager 140, the media agent 144, and/or a module executing on a primary storage device 104 or secondary storage device 108. In some embodiments, signatures 308 are derived each time data is written to or modified on a primary storage device 104. In other cases, signatures 308 are generated in association with a backup, restore, or other storage operation, or based on some other appropriate schedule, as determined by the storage policy. In an embodiment, the SHA-512 algorithm is used (e.g., on a 64 kB or 128 kB data block) to derive the signature 308. In some embodiments, the resulting signature is 256 bytes, and can be used for deduplication purposes. Hash functions other than SHA-512 can be used on the data blocks to derive the signature, as well as other non-hash functions. In addition, different sized signatures may be used.

The data block location field 312 can indicate the location of the data block in the secondary storage subsystem 118. The location information can include physical and/or logical memory address information usable to access the data block within the secondary storage device(s) 108. For example, the location information can include, but is not limited to, an identifier of the memory device or other information store where the data block resides, a cluster identifier and/or an offset.

Figure 3B:
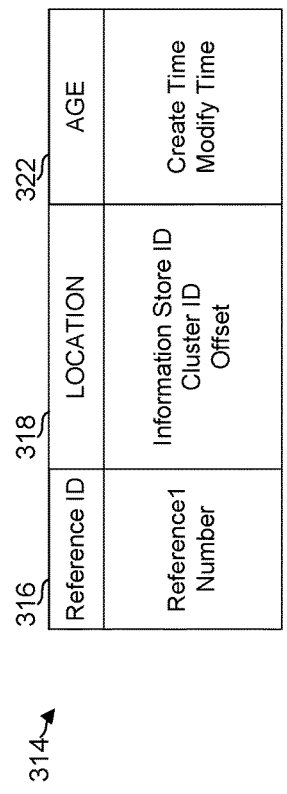
FIG. 3B is a block diagram illustrative of an expanded view of a signature block stored in the deduplication database of FIG. 3A, according to an illustrative embodiment.

FIG. 3B is a block diagram illustrative of an expanded view of an example of an entry 314 of a signature block 306 from FIG. 3A. In the illustrated example, each entry includes a reference ID field 316, a location information field 318, an access/priority information field 330, and an age information field 322.

The reference ID field 316 can include an identifier for a particular data block reference stored in the secondary storage subsystem 118. For example, in some embodiments, the first reference to the data block can have a reference ID of one, the second reference to the data block can have a reference ID of two, etc.

The location information field 318 can include information specifying the location of the data block reference in the secondary storage subsystem 118. The location information can additionally include physical and/or logical memory address information usable to access the reference to the data block within the secondary storage device 108. For example, the location information can include, but is not limited to, an identifier for the information store (e.g., memory device identifier) where the data block resides, a cluster identifier and/or an offset.

Each reference entry 314 can also include age information in an age field 322. The age field 322 can be used to determine how long a particular reference to a data block has existed in the secondary storage subsystem 118. The age field 322 in one embodiment includes an age ID which can be an alphanumeric indication of when the reference entry 314 was added or revised relative to other reference entries. For instance, the age ID may be a unique identifier for the particular reference to the data block.

The signature block 306 and/or corresponding reference entries 314 can contain fewer or more pieces of information than what is illustrated in the examples shown in FIGS. 3A and 3B. For example, the signature block 306 can include date data, such as the date when the signature block 306 was created or modified, etc. In some embodiments, the reference entries 314 can include file identifiers that indicate to which file, or backup, a reference entry 314 belongs. The file identifiers can be located in the location field 318, in another field, or in a separate field. Furthermore, the reference entries 314 can include organizational data that indicates where the data block corresponding to the reference entry 314 is located with respect to other data blocks in a particular file, etc. In some embodiments, the signature block 306 and each reference entry 314 can include a removal flag that indicates that the particular signature block 306 and/or reference entry 314 can be removed as part of a pruning operation, discussed in greater detail below with reference to FIGS. 6 and 7.

It will be understood, that although reference is made to the deduplication database 206, the embodiments described above can also apply to the local database 202, which includes complete or partial copies of the database entries in the deduplication database 206. Furthermore, it will be understood that because the working copies of the database entries in the local database 202 include some or all of the information in a signature block 306, the embodiments described above with reference to the signature block 306 can also apply to the working copies of the database entries in the local database 202.

Merging Local Database(s) with a Deduplication Database

Figure 4:
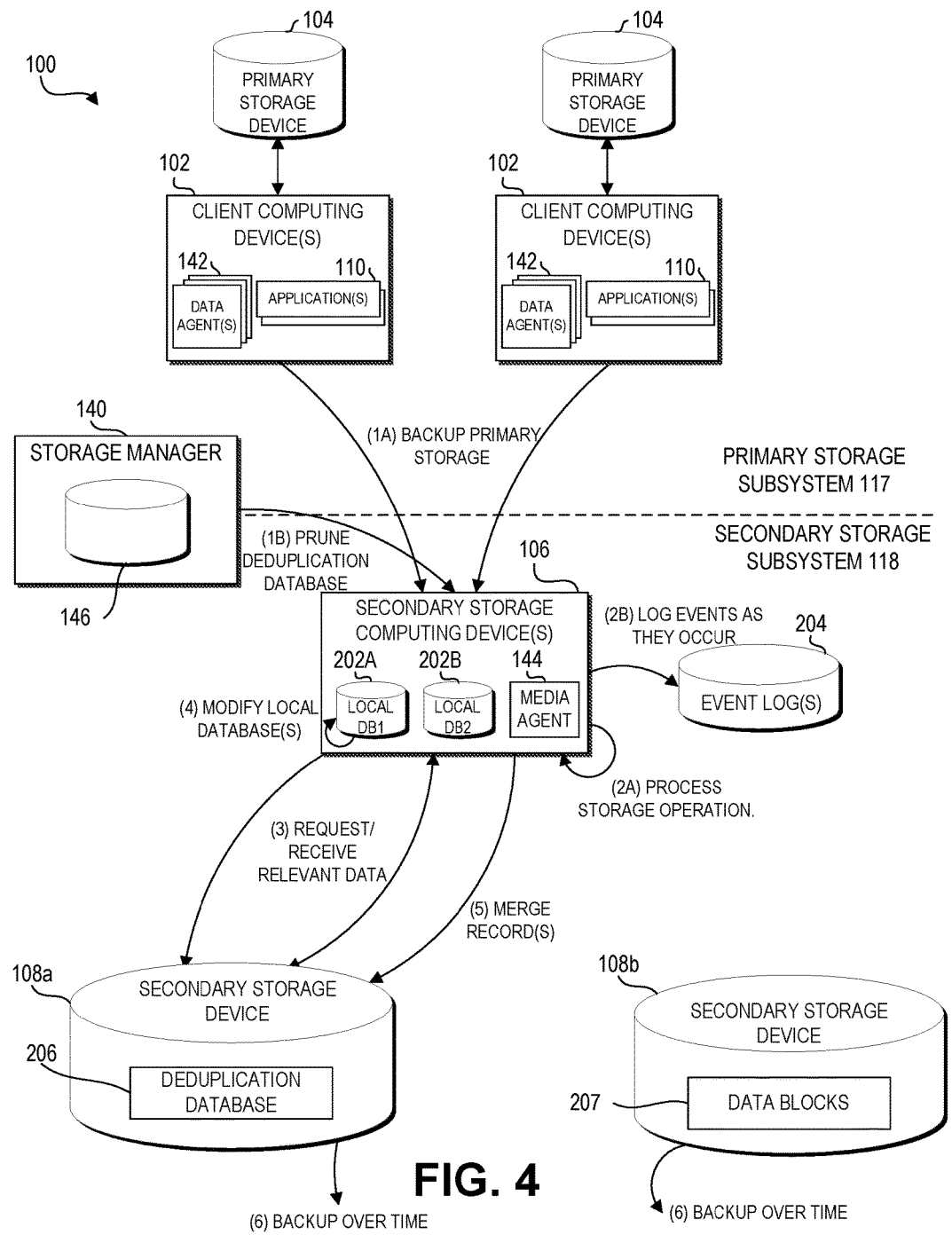
FIG. 4 is a data flow diagram illustrative of the interaction between various components of an exemplary information management system during a merge of deduplication database information local to a secondary storage computing device with an on-disk deduplication database, according to an illustrative embodiment.

FIG. 4 is a data flow diagram illustrative of an embodiment of the interaction between the various components of the information management system 100 of FIG. 2 with respect to a merge operation, where working copies of database entries in one or more local databases 202 are merged with the deduplication database 206. In this manner, deduplication data block information can be updated on a generally continuous or otherwise frequent basis local to the secondary storage computing device 106. These local updates can be forwarded for persistent storage in the secondary storage device(s) 108 according to a transaction-based scheme, thereby providing a relatively robust and efficient mechanism for maintaining deduplication information in the secondary storage subsystem 118.

Prior to performing a merge operation, the secondary storage computing device 106 can receive one or more instructions and/or data. The instructions can be to perform one or more information management operations, such as a backup or archive operation, deduplication data store pruning operation, etc. As illustrated, the secondary storage computing device 106 can receive the instructions and/or data from the storage manager 140 and/or the client computing devices 102. For example, as part of a (1A) backup operation, the secondary storage computing device 106 can receive data from the client computing devices 102, as packaged by the appropriate corresponding data agents 142, for backup to the secondary storage subsystem 118. The data can include one or more files to be backed up to the secondary storage subsystem 118, for example. The secondary storage computing device 106 or other appropriate entity in the secondary storage subsystem 118 can break the received files up at a level of chosen granularity into deduplication data blocks. In other cases, the data agent 142 or other appropriate entity in the primary storage subsystem 117 breaks the files up into the deduplication data blocks before sending the data to the secondary storage computing device 106. The received data can also include deduplication signatures corresponding to the data blocks in some such cases, or any other appropriate type of information.

Other types of operations are possible. As another example, the storage manager 140 can instruct the secondary storage computing device 106 to (1B) prune the deduplication database 206 and/or set of data blocks 207. For example, the storage manager 140 can instruct the secondary storage computing device 106 to (1B) prune the deduplication database 206 and/or set of data blocks 207 as part of routine maintenance of the deduplication data store, or the pruning may result from another information management operation such as an archive operation.

The storage operation can be scheduled based on any desired storage policy indicating that at certain times (e.g., once a day, once a week, etc.) or following certain events a particular storage operation is to be performed.

The secondary storage computing device 106 (2A) processes the instructions and/or data and (2B) logs the storage events as they occur into the event log 204. As part of the processing, the secondary storage computing device 106 can determine what changes to the deduplication database 206 and/or set of data blocks 207 are appropriate. For example, the secondary storage computing device 106 can determine whether entries are to be added, removed, or modified (e.g., reference counts incremented or decremented) from the deduplication database 206. Furthermore, in some embodiments, as part of the processing, the secondary storage computing device 106 can generate entries (e.g., including data block signatures and other appropriate information) that correspond to data blocks that are (or will be) stored in the set of data blocks 207.

In addition, as part of the processing, the secondary storage computing device 106 can determine whether any of the working copies of database entries that are already stored in the local databases 202 are affected by the storage operations. For example, the secondary storage computing device 106 can query the local database (e.g., local database 202A) for signatures that are part of the storage operation. If the secondary storage computing device 106 determines that the active local database 202A includes the relevant working copies, it can omit step (3).

As part of logging the events (2B), the secondary storage computing device 106 can log what storage events and/or associated modifications to the working copies in the local database 202 occurred, the time they occurred, and information regarding the other storage events as they occur, etc. It is to be understood that the secondary storage computing device 106 can log the storage events at any appropriate time, e.g., before, after, or concurrently with, any one of the actions illustrated in FIG. 4.

Upon processing the instructions, the secondary storage computing device 106 can (3) request and receive relevant data from the deduplication database 206. For example, if the secondary storage computing device 106 determines that a working copy of an entry corresponding to a particular data block is not found in the local database 202, it can request the particular entry, and/or any other relevant information, from the deduplication database 206. The requested entry and other information can include, but is not limited to, the data block signature, reference count of the signature, the location of the corresponding data block, etc.

The secondary storage computing device 106 (4) modifies the local database 202 as appropriate, in accordance with the data received from the client computing devices 102 (1A) and/or the storage manager 140 (16). For example, if the files to be backed up include one or more references to a data block that already exists in the set of data blocks 207 of the deduplicated data store, the secondary storage computing device 106 can increment the reference count of the working copy of the corresponding database entry. On the other hand, if a file is being modified or deleted such that one or more references to a data block that already exists in the set of data blocks 207 are to be deleted, the secondary storage computing device 106 can decrement the reference count of the working copy of the corresponding database entry. Upon decrementing the reference count, the secondary storage computing device 106 can also determine whether any references to the data block remain within the secondary storage device 108. For example, if the reference count is decremented to less than a threshold count, such as one, the secondary storage computing device 106 can determine that the corresponding data block is no longer needed and should be pruned from the set of data blocks 207. Accordingly, the secondary storage computing device 106 can modify the working copy of the database entry to include information sufficient to indicate that the corresponding database entry should be removed from the deduplication database 206 and/or that the data block should be removed from the set of data blocks 207.

If after processing the instructions, the secondary storage computing device 106 determines that the backup data set includes a new data block that does not already exist in the set of data blocks 207, the secondary storage computing device 106 can create a working copy of the database entry. Accordingly, in some instances, the local database 202 can include working copies of newly generated database entries that are not found in the deduplication database 206. The secondary storage device 106 may process the data block to generate the data block signature, for example, and then compile the working copy by including the generated signature as well as a reference count of one, or of greater than one if there are plural instances of the data block in the set of files to be backed up.

According to a storage policy, the secondary storage computing device 106 can (5) merge the local database 202 with the deduplication database 206. As part of the merge, the secondary storage computing device 106 can modify the local database 202 to be read-only such that no additional modifications can be made to the local database 202 during the merge. This can help keep the local database 202 and the deduplication database 206 synchronized. In this way, the information management system 100 can act as a transaction-based system.

In addition, as part of the merge operation, the secondary storage computing device 106 can send working copies of the database entries that are stored in the local database 202 to the deduplication database 206. The deduplication database 206 can update the deduplication database 206 based on the received working copies, e.g., by comparing the working copies of the database entries with the database entries that reside in the deduplication database 206 and make changes accordingly.

For example, if a database entry corresponding to the working copy in the local database 202 does not exist in the deduplication database 206, the deduplication database 206 can generate a new database entry based on the received working copy. If the working copy received from the secondary storage computing device 106 indicates that additional references to a data block have been, or will be, added to the secondary storage device 108, the deduplication database 206 can update the corresponding signature block with the relevant information. For example the deduplication database 206 can increment the reference count of the signature block and/or include the location of the new reference to the signature block within the secondary storage device 108.

Similarly, if the working copy received from the secondary storage computing device 106 indicates that one or more references to a data block are to be removed from the secondary storage device 108, the deduplication database 206 can update the corresponding signature block (or other type of entry in the deduplication database 206) with the relevant information. For example, the deduplication database 206 can decrement the reference count of the signature block and indicate the location within the secondary storage devices 108a, 108b, where the corresponding reference to the data block resides.

It will be understood that for simplicity, only some of the operations performed by the different components are illustrated. For example, in addition to what is illustrated in FIG. 4 and described below, the secondary storage computing device 106 can perform a number of other operations before, after, or concurrently with the operations described below. In addition, the deduplication database 206 and/or the set of data blocks 207 can be (6) backed up to one or more other secondary storage devices (not shown) according to a storage policy. In some embodiments, the backup of the deduplication database 206 and/or the set of data blocks 207 is handled by the secondary storage computing device 106.

Furthermore, although not illustrated in FIG. 4, it will be understood that the information management system 100 can perform additional operations. For example, in some embodiments, when one local database 202A is merging with the deduplication database 206, that local database 202A can be set to read-only, and a second local database 202B becomes the active local database. Accordingly, modifications to working copies are made in the second local database 202B during the merge. In certain embodiments, once the merge is completed, the working copies residing within the merged local database 202 are deleted. In some embodiments, following the merge, the log entries in the event log 204, or the entire event log 204, that correspond to the merged local database 202A are deleted. In some cases, more than two local databases 202A, 202B can be employed. For instance, where both the first and second local databases 202A, 202B become full or are otherwise scheduled for merging with the deduplication database 206, but have not yet been merged, the first and second local databases 202A, 202B can be designated as inactive pending the merge (e.g., set to read only permission), and a third local database can be created as an active database. Any number of local databases can be created in this manner in some embodiments, thereby allowing the secondary storage computing device 106 to continue processing the backup or other information management operation while the merges of the inactive local databases 202 are pending. In some other cases, there is a pre-defined maximum number of local databases 202A, 202B that can be created. Once the maximum is reached, one or more of the inactive local databases 202 must be merged with the deduplication database 206 and/or flushed before further operations involving the use of the local database 202 can proceed.

Figure 5:
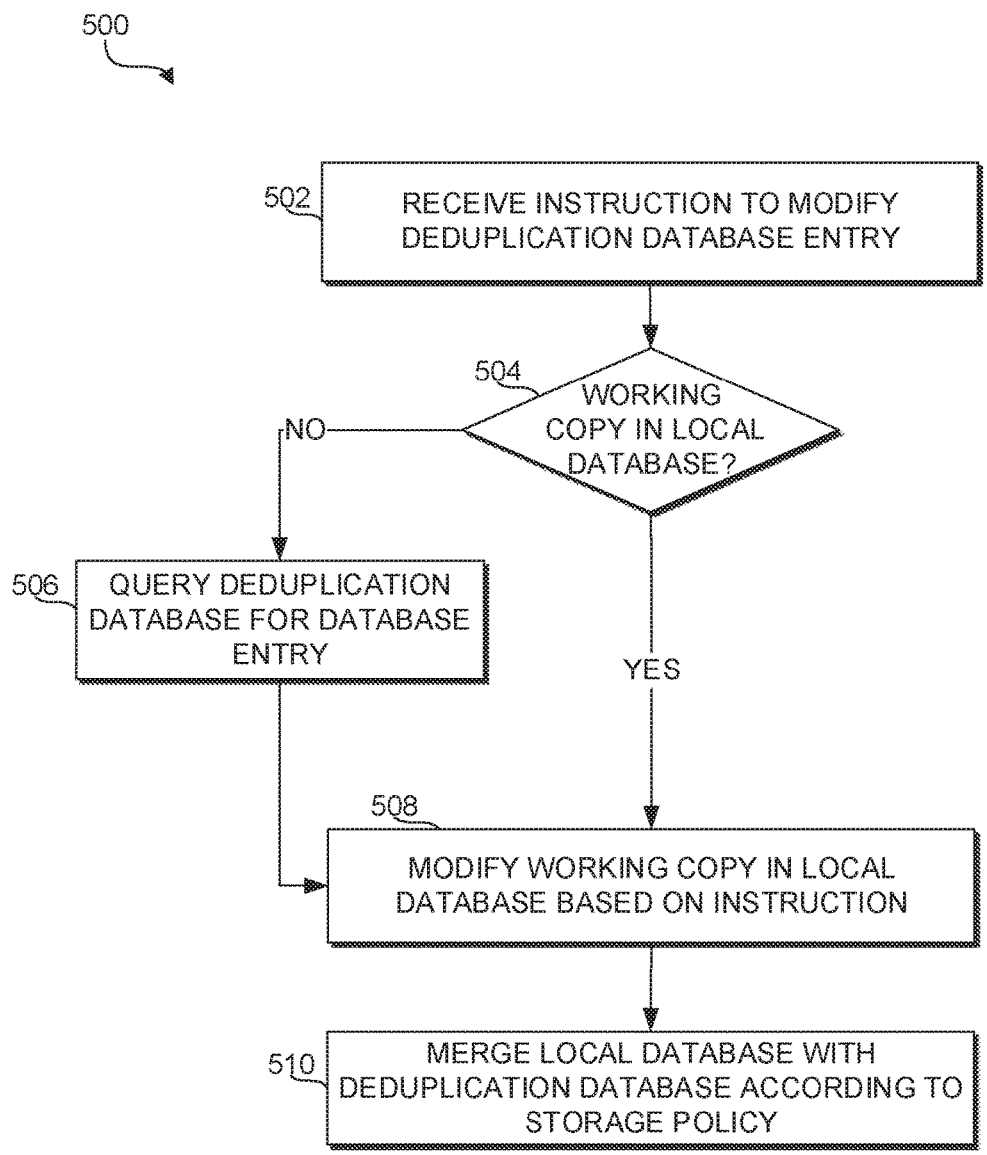
FIG. 5 is a flow diagram illustrating some operations of a routine implemented by an information management system for performing a merge of deduplication database information local to a secondary storage computing device with an on-disk deduplication database, according to an illustrative embodiment.

FIG. 5 is a flow diagram illustrative of an embodiment of a routine 500 implemented by the information management system 100 to merge a local database 202 with the deduplication database 206. One skilled in the relevant art will appreciate that the elements outlined for routine 500 can be implemented by one or more computing devices/components that are associated with the information management system 100, such as the client computing device 102, data agent(s) 142, media agent(s) 144, secondary storage computing device 106, and/or storage manager 150. Accordingly, routine 500 has been logically associated as being generally performed by information management system 100. However, the following illustrative embodiment should not be construed as limiting.

At block 502, the system receives one or more instructions to modify a database entry in the deduplication database 206. As described in greater detail above, the instructions can include one or more instructions to store or prune a data block in secondary storage, add/remove an entry in the deduplication database 206, increment/decrement the reference count of an entry, and the like. In addition, as described previously, the database entry in the deduplication database 206 can include a data block signature that corresponds to a data block that has resided, does reside, or will reside in the secondary storage device 108.

At decision block 504, the information management system 100 determines whether a working copy of the database entry resides in the local database(s) 202. To determine whether the local database(s) 202 includes a working copy of the database entry, the information management system 100 can query the local database(s) 202 for the data block signature. If the data block signature is found in the local database(s) 202, the information management system 100 can move to block 508, discussed below.

However, if the information management system 100 determines that the working copy is not in the local database, the information management system 100 can query the deduplication database 206 for the corresponding entry or to otherwise obtain the relevant data, as illustrated in block 506. If the deduplication database 206 has an entry corresponding to the relevant data block (or includes the relevant data in some other appropriate form), it can return it to the secondary storage computing device 106. If the deduplication database 206 does not have an entry corresponding to the relevant data block (and does not include the relevant data in other form), it can inform the secondary storage computing device 106 that this is the case.

In some embodiments, the relevant data queried for by the information management system 100 includes the database entry in the deduplication database 206 including the data block signature, or a portion thereof. In certain embodiments, upon receipt of the request from the secondary storage computing device 106, the information management system 100 can review the database entries for an entry that matches the data block signature. For example, another secondary storage computing device (not shown) associated with the secondary storage device 108*a* may review the entries in the deduplication database 206. In some cases, the same secondary storage computing device 106 that maintains the local database 202 can perform the review. If the entry is found, the database entry (or portions thereof) can be sent to the secondary storage computing device 106. For example, the secondary storage computing device 106 can receive the entry or a portion thereof, e.g., including the data block signature and the reference count of the signature obtained from the deduplication database 106. For instance, where another secondary storage computing device performs the review, it can forward the relevant information to the secondary storage computing device 106 that maintains the local database 202. On the other hand, if the signature is not found, an indication can be sent to the secondary storage computing device 106 indicating that the deduplication database 206 does not include an entry corresponding to the data block.

At block 508, the information management system 100 modifies the working copy of the database entry in the local database 202 based on the received instruction. In some embodiments, modifying the working copy includes generating the working copy, editing the working copy, adding information to the working copy sufficient to indicate that the corresponding data block and/or database entry are to be deleted, and/or deleting the working copy. In certain embodiments, if the relevant data is not found in the deduplication database 206 indicating that the data block is new to the deduplicated data store, and not already stored in the set of data blocks 207, the secondary storage computing device 106 can generate a working copy that can in turn be used as part of a merge operation to generate a database entry in the deduplication database 206.

If the instructions indicate that a new reference to the data block corresponding to the signature is stored (or will be stored) in the deduplicated data store in the secondary storage subsystem 118, the information management system 100 can increment the reference count. If the instructions indicate that a reference to the data block corresponding to the signature is being pruned from the deduplicated data store in the secondary storage subsystem 118, the information management system 100 can decrement the reference count. Furthermore, if the information management system 100 determines that no more references to the data block corresponding to the signature reside (or will reside following the storage operation) in the secondary storage subsystem, the information management system 100 can indicate that the working copy, the database entry, and/or the corresponding data block should be removed. In some embodiments, the information management system 100 can make the indication by setting a flag in the working copy. In certain embodiments, the information management system 100 can make the indication by placing the working copy in a table including entries for data blocks scheduled for deletion from the set of data blocks 207.

At block 510, the system merges the local database 202 with the deduplication database 206. In some embodiments, the information management system 100 merges the local database 202 with the deduplication database 206 according to a storage policy. As described previously, in certain embodiments, the storage policy can indicate that the local database 202 is to merge with the deduplication database 206 when a threshold time period has expired, e.g., since the last merge operation and/or when the size of the local database 202 satisfies a threshold size or contains a threshold number of entries/working copies.

As part of the merge operation, in some embodiments, the information management system 100 can compare the database entries in the deduplication database 206 with the working copies of the database entries that are stored in the local database 202. Based at least in part on the comparison, the information management system 100 can update the database entries in the deduplication database 206.

For example, in some embodiments, if a database entry in the deduplication database 206 corresponding to a working copy in the local database 202 cannot be found, the information management system 100 can generate the database entry. In certain embodiments, if the working copy in the local database 202 indicates that additional references to a data block have been, or will be, added to the secondary storage device 108, the information management system 100 can update the corresponding signature block in the deduplication database 206 with the relevant information. For example, the deduplication database 206 can increment the reference count of the signature block and/or include the location of the new reference to the signature block within the secondary storage device 108.

Similarly, in some embodiments, if the working copy received from the secondary storage computing device 106 indicates that one or more references to a data block are to be removed from the secondary storage device 108, the information management system 100 can update the corresponding signature block in the deduplication database 206 with the relevant information. For example, the information management system 100 can decrement the reference count of the signature block and indicate the location within the secondary storage device 108, where the corresponding reference resides. Furthermore, if the information management system 100 determines that there are no more references to a particular data block, the information management system 100 can flag the signature block and/or add an identifier for the data block (e.g., the data block signature) to a table that can be used to remove the data block from secondary storage.

Additional, fewer, or different blocks can be used to implement the routine 500 without departing from the spirit and scope of the description. For example, when multiple local databases 202 are used, the active local database 202 can query one or more other local databases 202, such as one or more read-only local databases 202 for the relevant data prior to querying the deduplication database 206. If the one or more other local databases 202 include the relevant data, the information management system 100 can copy the data to the active local database 202.

Pruning the Deduplication Data Store

Figure 6:
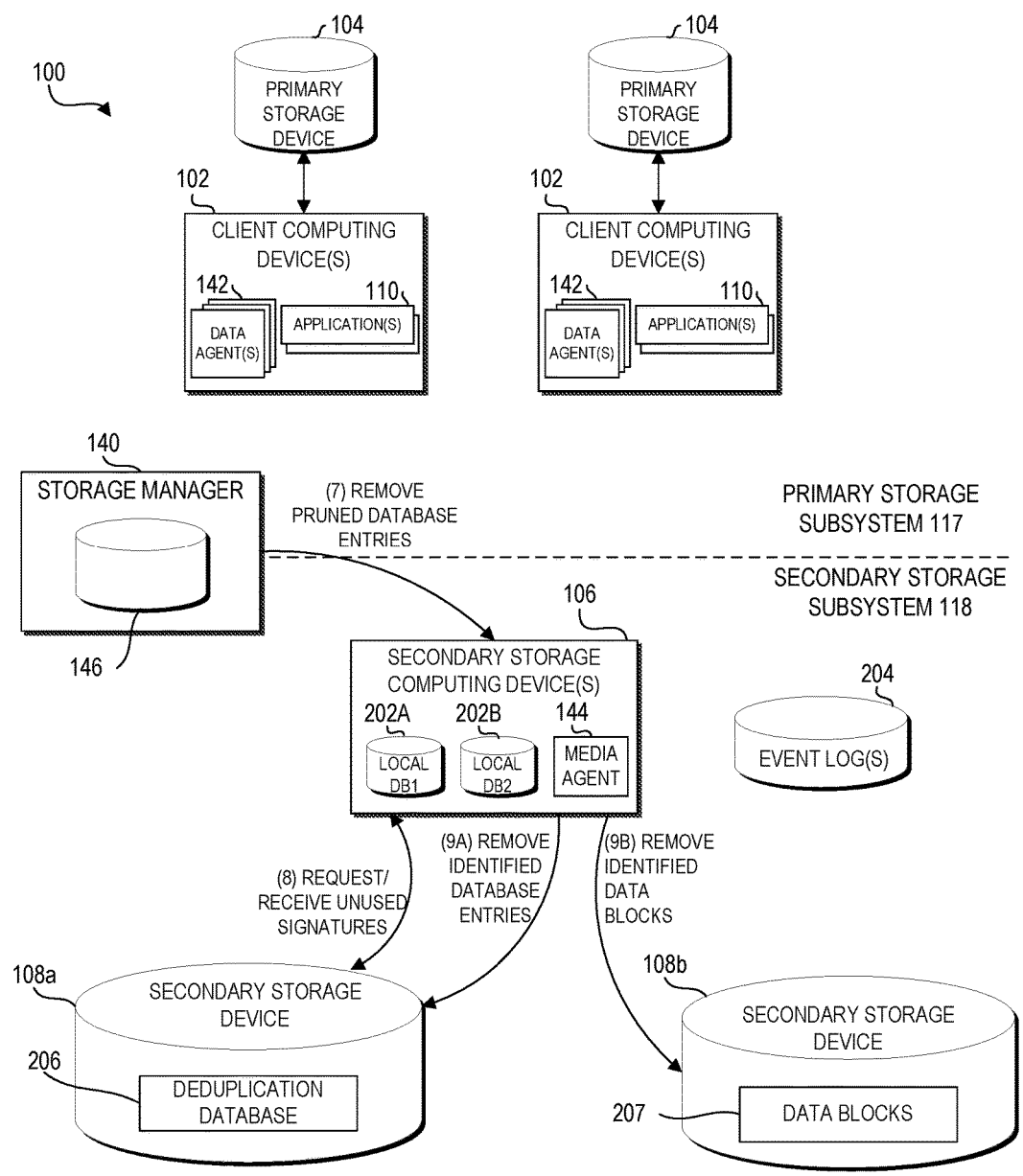
FIG. 6 is data flow diagram showing the interaction between various components of an exemplary information management system during a pruning operation in which one or more data blocks are deleted from a deduplicated data store, according to an illustrative embodiment.

FIG. 6 is a state diagram illustrative of an embodiment of the interaction between the various components of the information management system 100 with respect to a pruning operation where data blocks are removed from the set of data blocks 207 and/or corresponding database entries are removed from the deduplication database 206. For example, and with reference again to FIG. 4, the secondary storage computing device 106 can (1B) receive an instruction to prune one or more data blocks from the set of data blocks 207 and/or one or more database entries from the deduplication database 206. This can be part of a routine deduplication pruning operation directed by the storage manager, designed to free up space in the secondary storage subsystem 118. Or, the pruning can be a part of another information management operation. For instance, during an incremental backup operation some files in the backup set may have been modified or deleted since the last backup, such that no files in the deduplicated data store include any instances of some subset of the data blocks in the set of data blocks 207. In such cases, those data blocks can be scheduled for pruning. Pruning can additionally be caused by an archive operation in which some data blocks are removed from the set of data blocks 207 and copied to one or more other secondary storage devices, and thus scheduled for pruning.

As discussed, where a data block and/or database entry are to be pruned, the secondary storage computing device 106 can generally update the working copy of the corresponding database entry to include information sufficient to determine that the data block and/or database entry should be deleted. For instance, the working copies of the corresponding database entries in the local database 202 can be modified to decrement the reference count to zero, set a pruning flag, or otherwise indicate that deletion of the data block and/or corresponding database entry is appropriate.

With further reference to FIG. 4, as described previously, the changes to the local database 202 are (5) merged with the deduplication database 206. Once merged, the deduplication database 206 can be reviewed by a secondary storage computing device, storage manager 140, or other appropriate entity to identify the database entries and/or corresponding data blocks that can be removed. For example, the deduplication database 206 can generate a separate table of database entries and/or corresponding data blocks scheduled for removal. In some embodiments, a flag can be set in association with the relevant database entries identifying the entries and/or the corresponding data blocks for removal. Returning to FIG. 6, the secondary storage computing device 106 can receive an instruction to (7) remove the data blocks from the set of data blocks 207 (and/or database entries from the deduplication database 206) that have been scheduled for deletion/pruning. The secondary storage computing device 106 can receive the instruction from the storage manager 140 and/or initiate the removal based on a storage policy. In the illustrated embodiment, the secondary storage device 106 that receives the instruction to perform the removal is the same secondary storage device 106 that maintains the local database 202 and implemented the merge with the deduplication database 206. In other cases, a different secondary storage computing device or other appropriate entity performs the removal of the data blocks and/or database entries scheduled for deletion.

The secondary storage computing device 106 (or another secondary storage computing device or other appropriate entity) can review the deduplication database 206 to identify database entries identified for removal, e.g., as a result of one or more merge operations.

Once the secondary storage computing device 106 has identified the data blocks and/or corresponding database entries for removal, the secondary storage computing device 106 can (9A/9B) remove them, or cause the secondary storage devices 108a, 108b to remove them, as appropriate. Although not illustrated in FIG. 6, once completed, the deduplication database 206 can indicate to the secondary storage computing device 106, storage manager 140, or other appropriate entity that the removal process has completed successfully.

It will be understood that for simplicity, only some of the operations performed by the different components are illustrated. For example, in addition to what is illustrated in FIG. 6, the secondary storage computing device 106 can perform a number of other operations before, after, or concurrently with the operations described below. For example, in addition to identifying the database entries and/or reference entries 314 in the deduplication database 206 that are to be removed, the secondary storage computing device 106 can identify the corresponding data blocks (including data block references) in secondary storage that are to be removed. The secondary storage computing device 106 can also instruct the secondary storage device 108 to permanently remove the corresponding data block reference and/or data block itself from secondary storage, as applicable.

Figure 7:
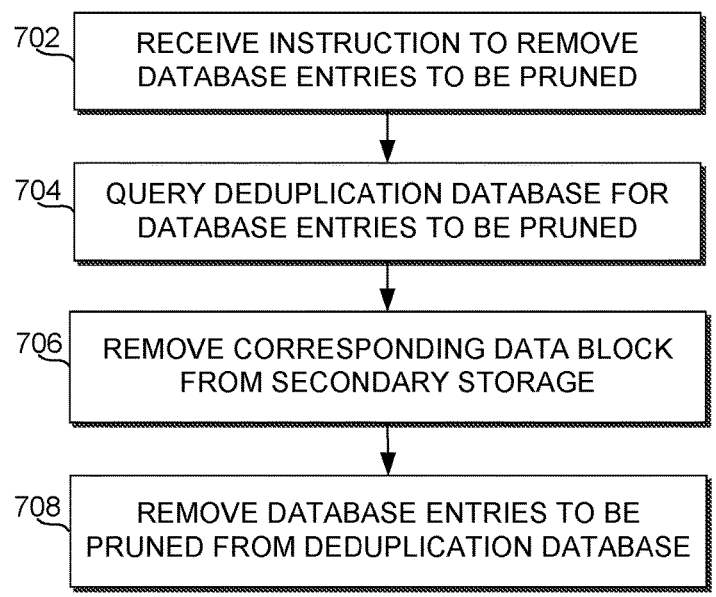
FIG. 7 is a flow diagram illustrating some operations of a routine implemented by an information management system for performing a pruning operation in which one or more data blocks are deleted from a deduplicated data store, according to an illustrative embodiment.

FIG. 7 is a flow diagram illustrative of an embodiment of a routine 700 implemented by the information management system 100 to prune the deduplication database 206. One skilled in the relevant art will appreciate that the elements outlined for routine 700 can be implemented by one or more computing devices/components that are associated with the information management system 100, such as the client computing device 102, data agent(s) 142, media agent(s) 144, secondary storage computing device 106, deduplication database 206, and/or storage manager 150. For instance, the routine 700 can be implemented by the information management system 100 shown in any of FIGS. 2, 4, and 6. Accordingly, routine 700 has been logically associated as being generally performed by information management system 100. However, the following illustrative embodiment should not be construed as limiting.

At block 702, the information management system 100 receives an instruction to remove database entries to be pruned and/or corresponding data blocks. For instance, in some embodiments, the instruction can be received from the storage manager 140. In certain embodiments, the information management system 100 initiates the removal process based on a storage policy. For example, the removal process can be initiated following one or more merge operations, once a day, once a week, etc.

At block 704, the information management system 100 queries the deduplication database 206 for database entries to be pruned. In some embodiments, the information management system 100 (e.g., a selected secondary storage computing device 106 or corresponding media agent 144) can review the database entries to identify the database entries and/or corresponding data blocks to be pruned (e.g., entries that have satisfied a threshold reference count). To accomplish this, in some embodiments, the information management system 100 can check a flag on each database entry and/or each reference entry 314. In certain embodiments, the information management system 100 can check the actual reference count of each database entry. Furthermore, in some embodiments, as part of the merge operation, the information management system 100 generates a separate table or other datastructure including the database entries and/or reference entries that are to be removed. In such embodiments the deduplication database 206 can identify the database entries to be pruned based on the database entries found in the generated table. Once the database entries to be pruned are identified, the deduplication database 206 can send an identifier of the database entries to be pruned to the secondary storage computing device 106.

At block 706, the information management system 100 removes the data blocks scheduled for deletion from the set of data blocks 207 residing on the secondary storage devices 108*b*. The information management system 100 can use location information (e.g., memory device identifier and/or memory address information) present in the deduplication database 206 to locate and remove the data blocks (including any data block references). For instance, a secondary storage computing device 106 or other appropriate entity may access the location information from the database entries in the deduplication database 206 that correspond to each data block scheduled for deletion.

At block 708, the information management system 100 can in some embodiments remove at least a portion of the database entries scheduled for deletion from the deduplication database 206. Such entries can include those that correspond to data blocks that were also deleted as part of the pruning operation, for example, or that were previously deleted as part of another pruning operation.

Additional, fewer, or different blocks can be used to implement the routine 700 without departing from the spirit and scope of the description. For example, in some embodiments, routine 700 can omit one of blocks 706 or 708. In certain embodiments, blocks 704-708 can be performed iteratively, e.g., on a data block by data block basis, or blocks 706 and 708 can be performed in parallel.

Reconstructing a Local Database Following a Failure

Figure 8:
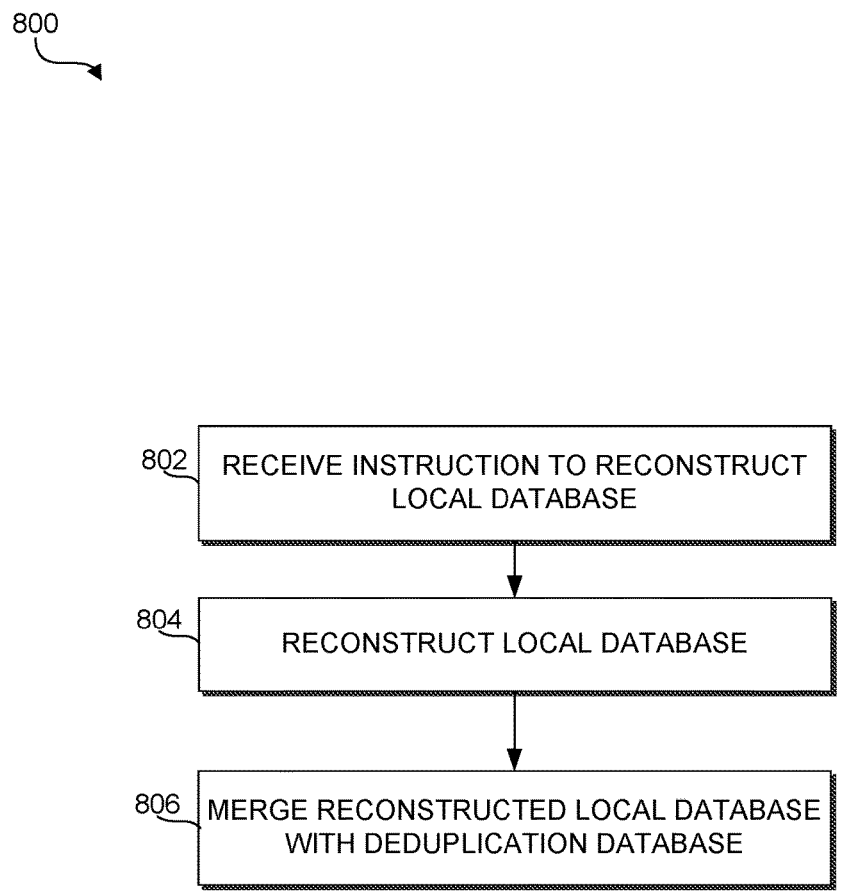
FIG. 8 is a flow diagram illustrating some operations of a routine implemented by an information management system for merging a reconstructed local deduplication database with an on-disk deduplication database, according to an illustrative embodiment.

FIG. 8 is a flow diagram illustrative of an embodiment of a routine implemented by an information management system for reconstructing a local database 202, such as in the event of a failure associated with the secondary storage computing device 106 hosting the local database 202. Such failures can include hardware failures as well as software failures such as a failure of a media agent 144 or other software component executing on the secondary storage computing device 106. One skilled in the relevant art will appreciate that the elements outlined for routine 800 can be implemented by one or more computing devices/components that are associated with the information management system 100, such as the client computing device 102, data agent(s) 142, media agent(s) 144, secondary storage computing device 106, deduplication database 206, and/or storage manager 150. For instance, the routine 800 can be implemented by the information management system 100 shown in any of FIGS. 2, 4, and 6. Accordingly, routine 800 has been logically associated as being generally performed by information management system 100. However, the following illustrative embodiment should not be construed as limiting.

At block 802, the information management system 100 receives an instruction to reconstruct one or more local databases 202, based at least in part on a failure of the secondary storage computing device 106. For example, in some embodiments, the information management system 100 (e.g., the storage manager 140) can detect a failure (e.g., hardware or software failure) of the secondary storage computing device 106. Following the failure, and as part of restoring the secondary storage computing device 106, the information management system 100 (e.g., the media agent 144 or the secondary storage computing device 106) can receive an instruction to reconstruct the contents of any local databases (e.g., 202A, 202B) that were lost as a result of the failure (e.g., contents of the local databases 202 that were not merged with the deduplication database 206 prior to the failure). For example, in some embodiments, the information management system 100 can identify the local databases 202 that were lost by accessing and reviewing entries in the event log 204, which can be stored in persistent, non-volatile memory such as on one or more hard drives or solid-state drives, for example. For instance, in the case of a failure of the media agent 144 running on the secondary storage computing device 106, once the media agent 144 is re-started, the media agent 144 can identify local databases that should be reconstructed by accessing and reviewing entries in the event log 204. As another example, where there is a hardware failure associated with the secondary storage computing device 106, a replacement secondary storage computing device 106 can be brought online, and the media agent 144 associated with the replacement secondary storage computing device can similarly identify the local databases 202 that need to be reconstructed by accessing and reviewing entries in the event log 204.

At block 804, the information management system 100 can reconstruct the local databases 202 that were lost. In some embodiments, the information management system 100 can use the event log 204 to reconstruct the local databases 202. As described previously, the event log 204 can log each storage event. These events can include any events resulting in modifications to the local databases 202 (e.g., resulting in creation and modification of working copies of entries from the deduplication database 206), or the actual modifications to the local databases 202 themselves. In some embodiments, a new event log is created each time a local database 202 is merged with the deduplication database 206. In some cases, the event log 204 can include entries indicating when the local databases 202 were merged with the deduplication database 206.

Accordingly, in certain embodiments, the information management system 100 can review the event log 204 to identify the most recent merge time of the local database 202 with the deduplication database 206. Once identified, the information management system 100 can re-play the contents of the event log 204 subsequent to the last merge to reconstruct the local databases 202. Where a new event log 204 is created after each merge, the information management system 100 can re-play all the contents of the event log 204 to reconstruct the local databases 202.

At block 806, the information management system 100 can merge the reconstructed local database(s) 202 with the deduplication database 206. The reconstructed local database(s) 202 can be merged with the deduplication database 206 as described above with reference to block 510 of FIG. 5.

Additional, fewer, or different blocks can be used to implement the routine 800 without departing from the spirit and scope of the description. For example, the routine 800 can include recording deduplication-related events in the event log 204, recording a create time of a local database, which can be used to identify which local databases 202 were lost, and/or recording a merge time of a local database with the deduplication database 206, etc. Furthermore, in some embodiments, once the information management system 100 detects a secondary storage computing device 106 failure, it can place the deduplication database 206 in an offline, or read-only state. In the offline/read-only state, the deduplication database 206 can be inaccessible for writes and/or can be accessible only to an administrator. Once the reconstructed databases 202 are merged with the deduplication database 206, the information management system 100 can return the deduplication database 206 to an online or read-write state.

Pruning of the Deduplicated Data Store Following a Failure

As indicated previously, in some embodiments the event log 204 is not configured to track pruning events, such as events that result in the scheduled deletion of a data block from the set of data blocks 207 or of a corresponding database entry from the deduplication database 206. Thus, the reconstruction and merge process of FIG. 8 utilizing the event log 204 may in such cases result in only a partial recovery from the failure associated with the secondary storage computing device 106 because pruning events captured by the local database 202 prior to the crash will be lost. The pruning events can be reissued in such cases as will be described with respect to FIG. 9. In other embodiments, the event log 204 captures pruning events, and a full recovery can be achieved using the event log 204, without reissuance of the pruning events.

Figure 9:
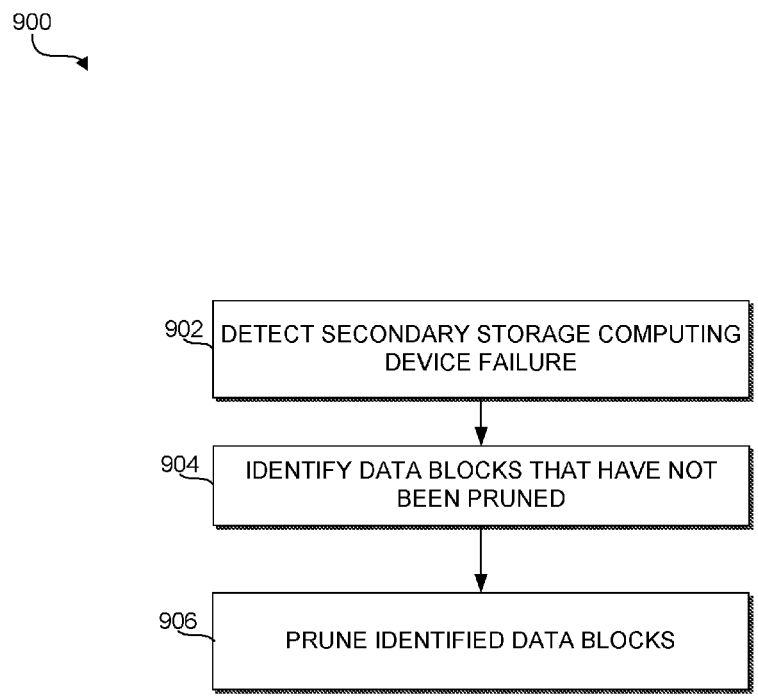
FIG. 9 is a flow diagram illustrating some operations of a routine implemented by an information management system for requesting a prune of a deduplicated data store after a failure, according to an illustrative embodiment.

FIG. 9 is a flow diagram illustrative of an embodiment of a routine implemented by an information management system for reissuing previously issued but unexecuted pruning events. At block 902 the information management system 100 can identify one or more data blocks and/or corresponding database entries that were previously scheduled for deletion, but have not yet been deleted, e.g., due to a failure associated with the secondary storage computing device 106 in which pruning information in the local database 202 was lost.

In some embodiments, the storage manager 140 can track which data blocks and/or corresponding database entries are to be pruned and/or whether they have actually been pruned successfully. For example, following a pruning operation, the secondary storage computing device 106 can transmit a report or other message to the storage manager 140 indicating that the secondary storage computing device 106 has completed the pruning. In some embodiments, the secondary storage computing device 106 can individually identify the data blocks that have been pruned. Accordingly, in some embodiments, if the storage manager 140 does not receive the message that the pruning has completed successfully, or if it receives an indication that some but not all of the data blocks and/or corresponding database entries that should have been deleted have actually been deleted, it can identify the data blocks and/or corresponding database entries that still need to be deleted.

At block 906, the information management system 100 can instruct the deduplication database 206 to prune the identified one or more data blocks and/or corresponding database entries. Accordingly, the data blocks and/or corresponding database entries that were intended for deletion can be pruned based on the new instruction. The information management system 100 can then initiate the pruning in any of the manners described herein, e.g., with reference to FIGS. 2 and 4-7.

Additional, fewer, or different blocks can be used to implement the routine 900 without departing from the spirit and scope of the description. For example, in some embodiments, the routine 900 can omit block 902. In such embodiments, the information management system 100 can identify one or more data blocks that were to be pruned, but have not been, and then instruct the deduplication database 206 to prune the identified data blocks.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed:

1. A non-transitory computer-readable medium comprising instructions, which when executed by a computing device comprising one or more processors and computer memory, cause the computing device to perform a method for removing information from a deduplication data store, the method comprising:

reviewing working copies of data block entries residing in memory local to the computing device to identify a first data block entry and a first data block corresponding to the first data block entry associated with a secondary storage operation,
wherein each of the working copies of data block entries corresponds to a respective data block entry stored in a first data store of a secondary storage subsystem that is distinct from the memory local to the computing device;

the first data block being stored in a second data store of the secondary storage subsystem, the second data store storing a set of data blocks including the first data block,
wherein a set of files formed from the set of data blocks are stored in deduplicated fashion;

wherein the first data store comprises a set of data block entries including the first data block entry, each entry in the set of data block entries corresponding to a respective data block in the set of data blocks and comprising at least: (i) a deduplication signature for the respective data block, and (ii) a reference count for a number of instances of the respective data block included in the set of files;

modifying a working copy of the first data block entry residing in the memory local to the computing device and corresponding to the first data block entry and the first data block;

updating the first data block entry stored in the first data store based on the modified working copy to indicate that the first data block should be removed from the second data store;

after the updating, querying the first data store to identify a group of one or more data blocks in the set of data blocks that should be removed from the second data store, the group including the first data block;

removing the group of one or more data blocks from the second data store; and removing from the first data store one or more data block entries that correspond to the group of one or more data blocks removed from the second data store.

2. The computer-readable medium of claim 1, wherein the updating of the first data block entry stored in the first data store comprises updating a value of the reference count of the first data block entry to generate a modified reference count value for the first data block.

3. The computer-readable medium of claim 2, wherein the querying of the first data store comprises identifying the first data block for removal from the second data store based on the modified reference count value indicating that a number of references to the first data block is below a threshold value.

4. The computer-readable medium of claim 3, wherein the threshold value is one and the updating of the value of the reference count of the first data block comprises decrementing the reference count of the first data block entry from one to zero.

5. The computer-readable medium of claim 1, wherein the updating of the first data block entry stored in the first data store comprises setting a flag for the first data block entry.

6. The computer-readable medium of claim 1, wherein the updating of the first data block entry stored in the first data store is initiated based on detecting at least one of: (a) expiration of a time threshold since a previous update to the first data store based on content of the memory local to the computing device, and (b) exceeding a size threshold of the memory local to the computing device.

7. The computer-readable medium of claim 1, wherein the updating of the first data block entry stored in the first data store comprises merging the modified working copy with the first data block entry contained in the first data store.

8. The computer-readable medium of claim 1, wherein the removing of the group of one or more data blocks from the second data store comprises for a given data block among the group of one or more data blocks removing a copy of the given data block from the second data store.

9. The computer-readable medium of claim 1, wherein the removing of the group of one or more data blocks from the second data store comprises for a given data block among the group of one or more data blocks removing a copy of the given data block from the second data store and additionally removing from the second data store one or more pointers to a respective copy of the given data block.

10. The computer-readable medium of claim 1, wherein the computing device is a secondary storage computing device that is part of the secondary storage subsystem.

11. The computer-readable medium of claim 1, wherein the computing device is part of the secondary storage subsystem, and wherein the secondary storage subsystem is part of an information management system that performs secondary storage operations including the secondary storage operation.

12. An information management system for pruning a deduplication database, the system comprising:
a data block data store contained in one or more storage devices of the information management system, wherein the data block data store stores a set of data blocks that form a set of files stored in deduplicated fashion;
a deduplication data store storing a set of data block entries, wherein each entry in the set of data block entries corresponds to a respective data block in the set of data blocks and comprises at least: (i) a deduplication signature for the respective data block, and (ii) a reference count for a number of instances of the respective data block that are included in the set of files;
a computing device residing in the information management system and comprising a local data store that is separate from the deduplicated data store and resides in memory local to the computing device,
wherein the local data store stores working copies of at least a subset of the set of data block entries, and
wherein the computing device further comprises computer processing hardware; and
wherein the computing device is configured to:
identify within the working copies a first data block entry and a first data block corresponding to the first data block entry that are associated with a secondary storage operation,
wherein the first data block entry is stored in the deduplication data store, and
wherein the first data block is stored in the data block data store,
modify a working copy of the first data block entry stored on the local data store that corresponds to the first data block entry and the first data block,
based on the modified working copy, cause the deduplication data store to indicate that the first data block is to be removed from the data block data store,
identify, based on a query of the deduplication data store, a group of one or more data blocks in the set of data blocks that are to be removed from the data block data store, wherein the group includes the first data block,
cause the group of one or more data blocks to be removed from the data block data store, and
cause one or more data block entries that correspond to the group of one or more data blocks to be removed from the deduplication data store.

13. The information management system of claim 12, wherein to modify the working copy of the first data block entry, the computing device is further configured to modify a value of the reference count of the first data block entry.

14. The information management system of claim 13, wherein to identify the group of one or more data blocks to be removed, the computing device is further configured to identify the first data block for removal from the data block data store based on the modified value of the reference count indicating that a number of references to the first data block is below a threshold value.

15. The information management system of claim 14, wherein the threshold value is one.

16. The information management system of claim 12, wherein the computing device is further configured to cause the deduplication data store to be updated based on detection of at least one of: (a) expiration of a time threshold since a previous update of the data block data store, and (b) exceeding a size threshold of the local data store.

17. The information management system of claim 12, wherein an update of the computing device includes merging content of the working copy of the first data block entry with the first data block entry contained in the deduplication data store.

18. A non-transitory computer-readable medium comprising instructions, which when executed by a computing device comprising one or more processors and computer memory, cause the computing device to perform a method for removing information from a deduplication data store, the method comprising:

identifying within working copies a first data block entry and a first data block corresponding to the first data block entry that are associated with a secondary storage operation, wherein the first data block entry is stored in a deduplication data store, and wherein the first data block is stored in a data block data store;

wherein the data block data store is contained in one or more storage devices of an information management system, and wherein the data block data store stores a set of data blocks that form a set of files stored in deduplicated fashion;

wherein the deduplication data store stores a set of data block entries, wherein each entry in the set of data block entries corresponds to a respective data block in the set of data blocks, including the first data block, and comprises at least: a deduplication signature for the respective data block and a reference count for a number of instances of the respective data block that are included in the set of files;

modifying a first working copy of the first data block entry stored on the local data store that corresponds to the first data block entry and the first data block;

based on the modified first working copy, causing the deduplication data store to indicate that the first data block is to be removed from the data block data store;

identifying, based on a query of the deduplication data store, a group of one or more data blocks in the set of data blocks that are to be removed from the data block data store, wherein the group includes the first data block;

causing the group of one or more data blocks to be removed from the data block data store; and causing one or more data block entries that correspond to the group of one or more data blocks to be removed from the deduplication data store.

19. The computer-readable medium of claim 18, wherein the modifying of the first working copy of the first data block entry comprises modifying a value of the reference count of the first data block entry.

20. The computer-readable medium of claim 18, wherein the modifying of the first working copy of the first data block entry comprises modifying a value of the reference count of the first data block entry; and wherein the identifying of the group of one or more data blocks to be removed comprises identifying the first data block for removal from the data block data store based on the modified value of the reference count indicating that a number of references to the first data block is below a threshold value.

* * * * *